(12) United States Patent
Kuze et al.

(10) Patent No.: US 7,480,232 B2
(45) Date of Patent: Jan. 20, 2009

(54) OPTICAL DISC APPARATUS

(75) Inventors: Yuichi Kuze, Osaka (JP); Katsuya Watanabe, Nara (JP); Takeharu Yamamoto, Osaka (JP); Takashi Kishimoto, Nara (JP); Kenji Fujiune, Osaka (JP)

(73) Assignee: Panasonic Corporation, Kadoma (JP)

( * ) Notice: Subject to any disclaimer, the term of this patent is extended or adjusted under 35 U.S.C. 154(b) by 685 days.

(21) Appl. No.: 11/159,801

(22) Filed: Jun. 23, 2005

(65) Prior Publication Data

US 2005/0237867 A1 Oct. 27, 2005

Related U.S. Application Data

(63) Continuation of application No. 10/046,561, filed on Nov. 9, 2001, now Pat. No. 6,925,048.

(30) Foreign Application Priority Data

Nov. 16, 2000 (JP) .............................. 2000-349342

(51) Int. Cl.
*G11B 7/24* (2006.01)
(52) U.S. Cl. ............... 369/275.3; 369/44.26; 369/53.44
(58) Field of Classification Search ... 369/275.1–275.5, 369/44.26, 53.44, 47.47, 30.3, 53.28, 53.23, 369/44.41, 47.49, 53.31, 44.35; 380/203, 380/201, 59
See application file for complete search history.

(56) References Cited

U.S. PATENT DOCUMENTS 5,706,047 A 1/1998 Lentz et al.
6,285,762 B1 9/2001 Gotoh et al.
6,285,763 B1 9/2001 Gotoh et al.
6,600,716 B1 7/2003 Kondo
6,925,048 B2 * 8/2005 Kuze et al. ............... 369/275.3

FOREIGN PATENT DOCUMENTS

| JP | 64-048230 | 2/1989 |
| JP | 05-266496 | 10/1993 |
| JP | 09-231586 | 9/1997 |
| JP | 10-097771 | 4/1998 |

OTHER PUBLICATIONS

Japanese Office Action for corresponding Application No. 2001-348112 dated May 17, 2006.

* cited by examiner

*Primary Examiner*—Ali Neyzari
(74) *Attorney, Agent, or Firm*—Renner, Otto, Boisselle & Sklar, LLP

(57) ABSTRACT

An optical disc apparatus according to the present invention is usable for an optical disc including a bar code area and a control data area adjacent to the bar code area in a radial direction of the optical disc. The optical disc apparatus includes an optical head for directing an optical beam toward the optical disc so as to form an optical spot on the optical disc and output a signal in accordance with the optical beam reflected by the optical disc; a bar code area determination section for determining whether or not the optical spot is positioned on the bar code area of the optical disc based on the signal output by the optical head; and a control section for controlling the optical head so that the optical spot moves toward the control data area, when the optical spot is determined to be positioned on the bar code area.

5 Claims, 19 Drawing Sheets

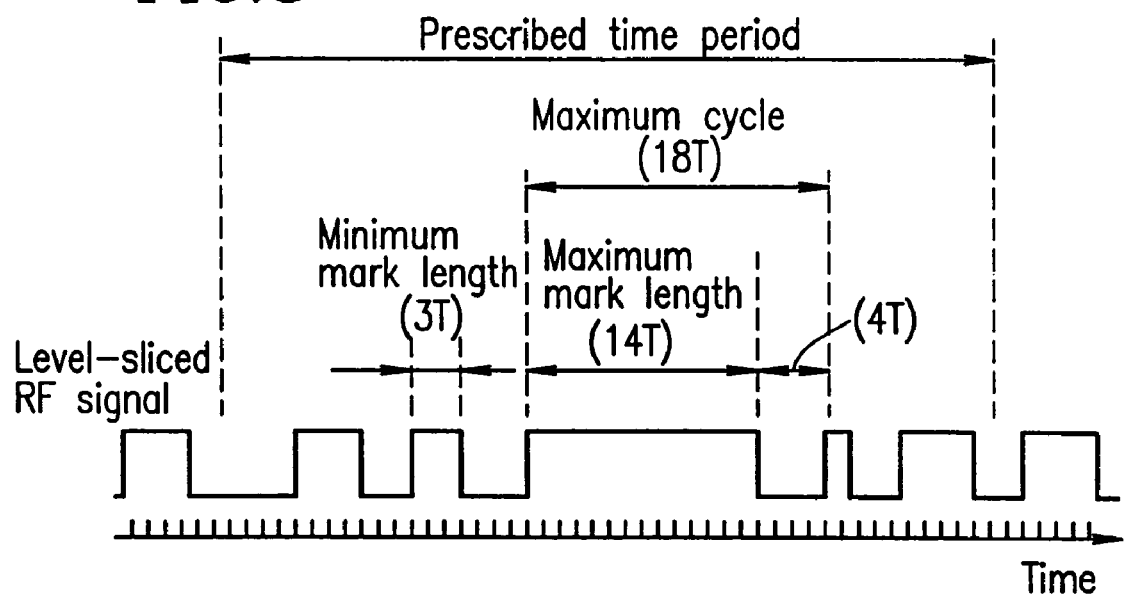

OPTICAL DISC APPARATUS

This is a continuation of application Ser. No. 10/046,561 filed Nov. 9, 2001 now U.S. Pat. No. 6,925,048.

BACKGROUND OF THE INVENTION

1. Field of the Invention

The present invention relates to an optical disc apparatus. More specifically, the present invention relates to an optical disc apparatus for, when an optical beam spot formed by an optical head is positioned in a bar code area, controlling the optical head so that the optical beam spot moves toward a control data area adjacent to the bar code area in a radial direction of an optical disc.

2. Description of the Related Art

An optical disc with a barcode (or a bar-coded optical disc) is known as a bar-coded read-only information recording medium (hereinafter, referred to as a "bar-coded ROM disc"). Data stored on the bar-coded optical disc is reproduceable.

A bar-coded optical disc generally includes a user data area, a control data area provided inside the user area, and a bar code area provided inside the control data area.

In the user data area, user data is recorded. User data can be, for example, music data to be reproduced by an optical disc apparatus based on an instruction of the user, or file data used in a computer. In the control data area, control data is recorded. Control data is, for example, information regarding physical characteristics of a bar-coded ROM disc, such as the capacity, type and the like of the bar-coded ROM disc. In a bar code area, bar code data is recorded by means of a bar code. Bar code data is, for example, data used for preventing illegal copying of information and/or data of a production serial number of the optical disc. Unlike the user data and the control data, the bar code data is recorded in the form of a bar code. The bar code is recorded by optically processing the optical disc, for example, removing a portion of a reflective film of the optical disc or directly printing ink on the optical disc. According to one specific method for forming a bar code in the bar code area, a portion of the reflective film provided on a recording face of the optical disc is removed by a technique such as, for example, laser cutting.

Bar code data, which is recorded in a form different from that of the user data or the control data, needs to be reproduced by a device different from a device for reproducing the user data or the control data.

An example of the bar-coded ROM disc, Japanese Laid-Open Publication No. 10-97771 discloses a bar-coded optical disc including a user data area, a control data area and a bar code area.

FIG. 17 shows a structure of such a bar-coded optical disc 1700. Part (a) of FIG. 17 shows a plan view of the bar-coded optical disc 1700, and part (b) of FIG. 17 shows a cross-sectional view thereof, illustrating a positional relationship of a bar code area 1710 bearing a bar code 1750, a control data area 1720, a user data area 1730, and a ROM area 1740 of the bar-coded optical disc 1700. The bar-coded optical disc 1700 is a ROM disc, and will be referred to also as a "bar-coded ROM disc 1700".

As shown in FIG. 17, the bar code area 1710 is provided in an inner area of the bar-coded optical disc 1700. The bar code 1750 is formed in the bar code area 1710. The control data area 1720 is provided outside the bar code area 1710, and the user data area 1730 is provided outside the control data area 1720. The ROM area 1740 includes a portion of the bar code area 1710, the control data area 1720 and the user data area 1730. The bar code area 1710 is adjacent to the control data area 1720 in a radial direction of the bar-coded optical disc 1700, and the control data area 1720 is adjacent to the user data area 1730 in the radial direction.

In part (b) of FIG. 17, R1 represents a length in the radial direction from the center of the bar-coded optical disc 1700 to the inner periphery of the bar code area 1710. R2 represents a length in the radial direction from the center of the bar-coded optical disc 1700 to the inner periphery of the ROM area 1740. R3 represents a length in the radial direction from the center of the bar-coded optical disc 1700 to the inner periphery of the control data area 1720. R4 represents a length in the radial direction from the center of the bar-coded optical disc 1700 to the inner periphery of the user data area 1730. R5 represents a length in the radial direction from the center of the bar-coded optical disc 1700 to the outer periphery of the user data area 1730. In the case where the bar-coded optical disc 1700 is a DVD, R1, R2, R3, R4 and R5 are respectively 22.3 mm, 22.6 mm, 23.5 mm, 24.0 mm and 58 mm as shown in part (b) of FIG. 17.

In the bar code area 1710, data such as, for example, an ID, a manufacturer, a lot number or a serial number of each bar-coded optical disc 1700 is recorded as the bar code 1750.

In the control data area 1720, physical format information regarding the type and format of the bar-coded optical disc 1700 (e.g., disc type, track density, or number of layers) is recorded as control data.

In the ROM area 1740, pits are formed in advance in a plurality of tracks. Data is recorded by way of the pits. Generally, no data is recorded in an area of the ROM area 1740 which is a portion of the bar code area 1710 for the following reason. The barcode 1750 is formed after the pits are formed in the ROM area 1740. Therefore, pits formed in such a portion may be undesirably deformed by the formation of the bar code 1750.

In general, an optical disc apparatus includes an optical head and a control section for controlling the optical head. The optical head directs an optical beam toward a bar-coded optical disc so as to form an optical spot on the bar-coded optical disc and outputs a signal in accordance with the optical beam reflected by the bar-coded optical disc. The optical head can read information (data and address) from a portion of the bar-coded optical disc, on which the optical spot is formed, as a signal generated in accordance with the optical beam reflected by the portion.

Hereinafter, an operation of a conventional optical disc apparatus when accessing the control data area 1720 of the bar-coded optical disc 1700 will be described.

The control section controls the optical head so as to form an optical spot in the control data area 1720 of the bar-coded optical disc 1700. However, there is sometimes an error in the control of the optical head by the control section. For example, the control section cannot control the optical head so that the optical spot directly moves to the control data area 1720 because of a mechanical error in a mechanism for moving the optical head and a small size of the control data area 1720. Therefore, rather than directly positioning the optical spot to the control data area 1720, the control section first moves the optical spot outside the control data area 1720, i.e., the user data area 1730 and then moves the optical spot to the control data area 1720.

In more detail, the control section operates as follows. In the state where the optical spot is in the user data area 1730, the control section performs focusing control and then performs tracking control so as to cause the optical spot emitted by the optical head to follow the tracks of the bar-coded optical disc 1700. Thus, an address representing the position of the optical spot is read. Once the address representing the position of the optical spot is read, the control section can control the optical head so that the optical spot keeps on jumping from one track to the next track until reaching the control data area 1720. (Hereinafter, the operation of the optical spot jumping from one track to the next track will be referred to as "one-track jumping".) In the bar-coded optical disc 1700, the user area data 1730 has information represented by pits, as in the control data area 1720. Therefore, the control section can control the optical head so that the optical spot performs one-track jumping from the user area data 1730 to the control data area 1720.

The control section cannot control the optical head to move from the bar code area 1710 to the control data area 1720. Since the bar code area 1710 has the bar code 1750, an address representing the position of the optical spot cannot be properly read from the bar code area 1710. Therefore, the control section cannot control the optical head so that the optical spot performs one-track jumping from the bar code area 1710 to the control data area 1720.

The conventional optical disc apparatus is designed only to handle a read-only bar-coded ROM disc as described above. The conventional optical disc apparatus has the following problem with a bar-coded RAM disc including a bar code area.

As described above, in general, a control section of an optical disc apparatus controls an optical head so that the optical spot repeats one-track jumping based on an address representing the position of the optical spot until reaching the prescribed address at which data is to be read.

An address representing the position of the optical spot in a bar code area of the optical disc is not accurate. Therefore, the control section cannot control the optical head so that the optical spot on the bar code area to accurately perform one-track jumping.

Accordingly, when the control section controls the optical head so that the optical head outputs a signal from a control data area adjacent to the bar code area in a radial direction of the optical disc, the control section conventionally needs to control the optical head so that the optical spot formed by the optical head does not enter at least the bar code area in order to allow the optical head to output a signal from the control data area with certainty.

SUMMARY OF THE INVENTION

An optical disc apparatus according to the present invention is usable for an optical disc including a bar code area and a control data area adjacent to the bar code area in a radial direction of the optical disc. The optical disc apparatus includes an optical head for directing an optical beam toward the optical disc so as to form an optical spot on the optical disc and output a signal in accordance with the optical beam reflected by the optical disc; a bar code area determination section for determining whether or not the optical spot is positioned on the bar code area of the optical disc based on the signal output by the optical head; and a control section for controlling the optical head so that the optical spot moves toward the control data area, when the optical spot is determined to be positioned on the bar code area.

In one embodiment of the invention, the optical disc further includes a recording and reproduction area on which the optical head records a signal.

In one embodiment of the invention, the optical disc apparatus further includes a control data area determination section for determining whether or not the optical spot is positioned on the control data area of the optical disc, and an address detection section for detecting an address representing a position of the optical spot on the control data area based on the signal output by the optical head, when the optical spot is determined to be positioned on the control data area. The control section controls movement of the optical head based on the address detected by the address detection section.

In one embodiment of the invention, the optical disc apparatus further includes a control data area determination section for determining whether or not the optical spot is positioned on the control data area of the optical disc. The control section controls the optical head so that the optical spot moves toward the control data area until the optical spot is determined to be on the control data area.

In one embodiment of the invention, a maximum cycle of cycles of the signal output by the optical head in accordance with the optical beam in the case where the optical beam is reflected by the control data area of the optical disc is set as a set cycle. A cycle of a signal output by the optical head in accordance with the optical beam in the case where the optical beam is reflected by the bar code area of the optical disc is longer than the set cycle. The bar code area determination section includes a maximum cycle detection section for detecting the maximum cycle of the signal output by the optical head, and a cycle comparison section for comparing the maximum cycle detected by the maximum cycle detection section and the set cycle, so as to determine whether or not the optical spot is positioned on the bar code area.

In one embodiment of the invention, when the maximum cycle detected by the maximum cycle detection section is sufficiently larger than the set cycle, the cycle comparison section determines that the optical spot is positioned on the bar code area.

In one embodiment of the invention, the bar code area determination section includes a maximum cycle detection section for detecting a maximum cycle of cycles of the signal output by the optical head, a read clock cycle detection section for detecting a read clock cycle of the signal output by the optical head, and a cycle comparison section for comparing a ratio between the maximum cycle detected by the maximum cycle detection section and the read clock cycle detected by the read clock cycle detection section, with a set clock coefficient set for the signal in accordance with the optical beam in the case where the optical beam is reflected by the bar code area of the optical disc, so as to determine whether or not the optical spot is positioned in the bar code area.

In one embodiment of the invention, the read clock cycle detection section includes a minimum mark length detection section for detecting a minimum mark length of a signal read from the optical disc; and a read clock cycle deriving section for deriving a read clock cycle based on the minimum mark length detected by the minimum mark length detection section and a prescribed coefficient of the minimum mark length.

In one embodiment of the invention, the bar code area determination section includes a maximum cycle detection section for detecting a maximum cycle of cycles of the signal output by the optical head, a rotation cycle measurement section for measuring a rotation cycle of the optical disc, and a cycle comparison section for determining whether or not the optical spot is positioned on the bar code area of the optical disc based on the maximum cycle detected by the maximum cycle detection section and the rotation cycle measured by the rotation cycle measurement section.

In one embodiment of the invention, the bar code area determination section determines whether or not the optical spot is positioned on the bar code area of the optical disc in a prescribed time period which corresponds to at least $11/120$ of a rotation of the optical disc.

In one embodiment of the invention, the bar code area determination section includes a smoothing section for outputting a smoothed signal obtained by smoothing the signal output by the optical head; and a comparison section for comparing a time period in which the smoothed signal generated by the smoothing section changes by at least a prescribed level, with a prescribed time period, so as to determine whether or not the optical spot is positioned on the bar code area of the optical disc.

In one embodiment of the invention, the bar code area determination section includes an amplitude signal generation section for generating an amplitude signal from the signal output by the optical head; and a comparison section for comparing a time period in which the amplitude signal generated by the amplitude signal generation section changes by at least a prescribed level, with a prescribed time period, so as to determine whether or not the optical spot is positioned on the bar code area of the optical disc.

In one embodiment of the invention, the bar code area has bar code data recorded therein. The optical disc apparatus further comprising a bar code data reproduction section for reproducing the bar code data in accordance with the signal output by the optical head when the optical spot is determined to be positioned on the bar code area, and a bar code data storage section for storing the bar code data reproduced by the bar code data reproduction section.

In one embodiment of the invention, the optical disc apparatus further includes a position measuring section for measuring a position to which the optical spot has moved by the control section controlling the optical head; and a position storage section for storing the position at which the optical spot is determined to be positioned on the bar code area of the optical disc.

According to the present invention, even when, for example, the error of the control section for controlling the optical head is significantly large and thus the optical spot is in the bar code area, or even when the optical spot which is in the control data area moves to the bar code area by an external impact or the like, the optical spot can be moved from the bar code area to the control data area.

Thus, the invention described herein makes possible the advantages of providing (1) an optical disc apparatus suitable for accessing a control data area of a bar-coded RAM disc, i.e., a bar-coded read/write information recording medium, and (2) an optical disc apparatus for controlling an optical spot to move from a bar code area to a control data area of a bar-coded optical disc.

These and other advantages of the present invention will become apparent to those skilled in the art upon reading and understanding the following detailed description with reference to the accompanying figures.

BRIEF DESCRIPTION OF THE DRAWINGS

FIG. 8 is a waveform diagram illustrating a signal detected by a maximum cycle detection section according to the present invention;

DESCRIPTION OF THE PREFERRED EMBODIMENTS

Hereinafter, the present invention will be described by way of illustrative examples with reference to the accompanying drawings.

A bar-coded read/write information recording medium (hereinafter, referred to as a "bar-coded RAM disc") will be described.

Figure 1:
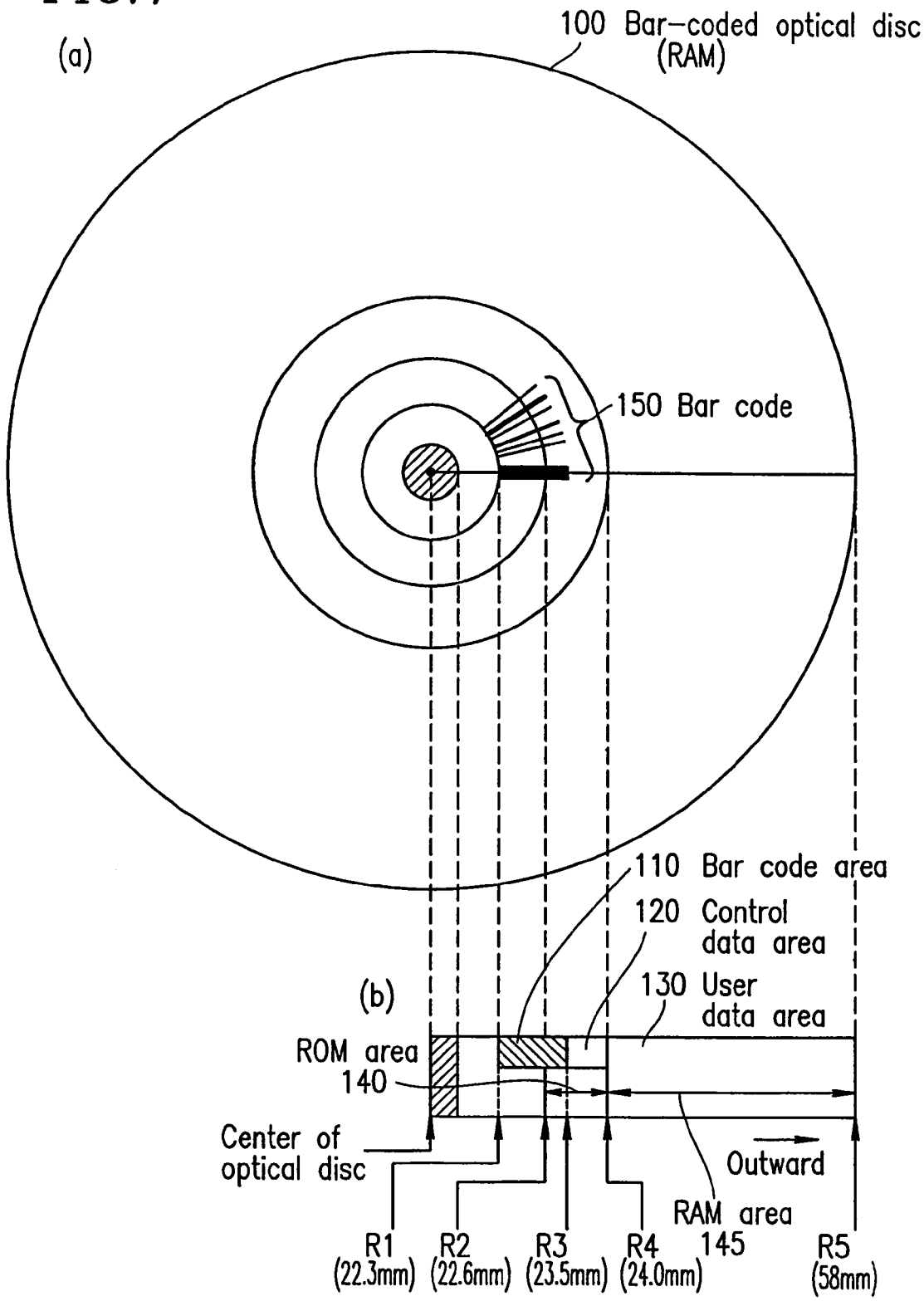
FIG. 1 schematically shows a bar-coded RAM disc according to the present invention.

FIG. 1 schematically shows a structure of a bar-coded RAM disc 100 according to the present invention. Part (a) of FIG. 1 shows a plan view of the bar-coded RAM disc 100, and part (b) of FIG. 1 shows a cross-sectional view thereof, illustrating a positional relationship of a bar code area 110 bearing a bar code 150, a control data area 120, a user data area 130, a ROM area 140, and a RAM area 145 of the bar-coded RAM disc 100. In the RAM area 145, data can be written once or rewritten a plurality of times.

As shown in FIG. 1, the bar code area 110 is provided in an inner area of the bar-coded RAM disc 100. The bar code 150 is formed in the bar code area 110. The control data area 120 is provided outside the bar code area 110, and the user data area 130 is provided outside the control data area 120. The ROM area 140 includes a portion of the bar code area 110 and the control data area 120. The RAM area 145 is the user data area 130. The bar code area 110 is adjacent to the control data area 120 in a radial direction of the bar-coded RAM disc 100, and the control data area 120 is adjacent to the user data area 130 in the radial direction.

In part (b) of FIG. 1, R1 represents a length in the radial direction from the center of the bar-coded RAM disc 100 to the inner periphery of the bar code area 110. R2 represents a length in the radial direction from the center of the bar-coded RAM disc 100 to the inner periphery of the ROM area 140. R3 represents a length in the radial direction from the center of the bar-coded RAM disc 100 to the inner periphery of the control data area 120. R4 represents a length in the radial direction from the center of the bar-coded RAM disc 100 to the inner periphery of the user data area 130. R5 represents a length in the radial direction from the center of the bar-coded RAM disc 100 to the outer periphery of the user data area 130. In the case where the bar-coded RAM disc 100 is a DVD, R1, R2, R3, R4 and R5 are respectively 22.3 mm, 22.6 mm, 23.5 mm, 24.0 mm and 58 mm as shown in part (b) of FIG. 1.

Figure 17:
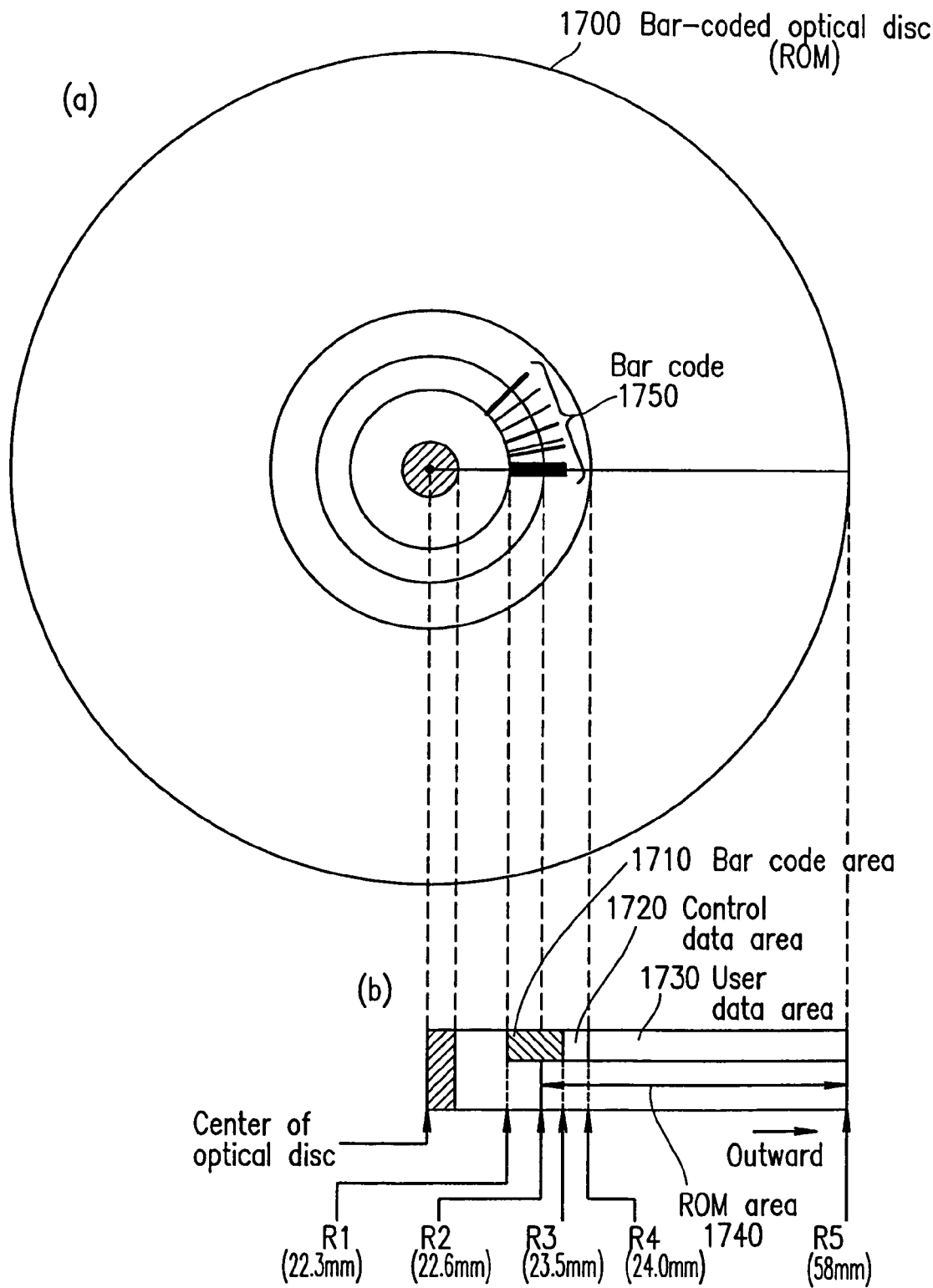
FIG. 17 schematically shows a bar-coded ROM disc.

The bar-coded RAM disc 100 has substantially the same structure as that of the bar-coded ROM disc 1700 shown in FIG. 17 except that the user area 130 is the RAM area 145 and that the ROM area 140 includes a portion of the bar code area 110 and the control area 120. Based on an instruction from a user, an optical head of an optical disc apparatus can record user data in the RAM area 145 or read user data from the RAM area 145.

Generally, data is recorded in the RAM area 145 in a different form from that of the ROM area 140 as described below in detail.

Figure 2:
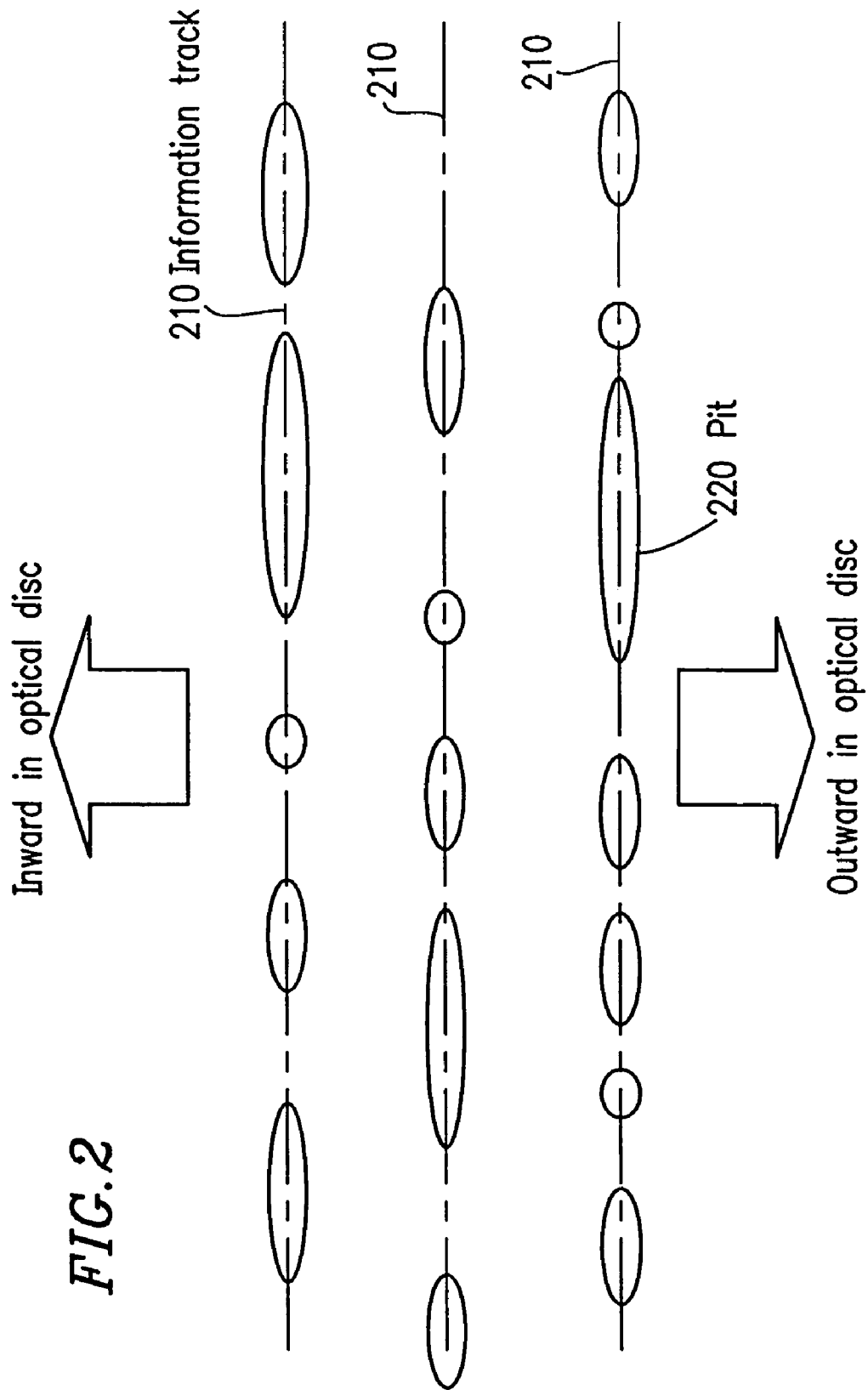
FIG. 2 is a schematic view of information tracks and pits of a ROM area of a bar-coded optical disc.

Data recorded in the ROM area 140 need not be rewritten. Therefore, data is recorded in the ROM area 140 as phase pits when a substrate of the bar-coded RAM disc 100 is formed. FIG. 2 shows pits 220 formed in information tracks 210 in the ROM area 140. The pits 220 are formed in the ROM area 140 of the bar-coded RAM disc 100 by embossing, like in the ROM area 1740 of the bar-coded ROM disc 1700 (FIG. 17). As described above, when an address representing the position of an optical spot in the ROM area 140 can be read, the optical spot can be controlled to perform one-track jumping inward or outward of the bar-coded RAM disc 100.

Data recorded in the RAM area 145 has a high possibility of being rewritten. Therefore, data is recorded in the RAM area 145 in the form of a recording mark in a recording film which is formed on the substrate having grooves.

A bar-coded RAM disc can be produced by forming a bar code in any RAM disc in a similar manner to a bar-coded ROM disc.

When a conventional optical disc apparatus accesses the bar-coded RAM disc 100 shown in FIG. 1, the following problems occur.

(1) As described above, the control data area 120 and the user data area 130 in the bar-coded RAM disc 100 have different shapes and have data recorded in different forms from each other. Therefore, the user data area 130 uses a push-pull tracking error signal for tracking control, whereas the control data area 120 uses a differential phase tracking error signal for tracking control. Due to the different tracking error signals used in the control data area 120 and the user data area 130, when the optical spot moves from the user data area 130 to the control data area 120 or vice versa by overrun during a seek operation, tracking control becomes unstable, possibly resulting in the optical spot being off the target track.

(2) In the bar-coded RAM disc 100, the user data area 130 provided outside the control data area 120 is the RAM area 145. Comparing the bar-coded ROM disc 1700 and the bar-coded RAM disc 100, the ROM area 1740 of the bar-coded ROM disc 1700 outside the bar code area 1710 includes the control data area 1720 and the user data area 1730, whereas the ROM area 140 of the bar-coded RAM disc 100 outside the bar code area 110 includes only the control data area 120. In the case where the bar-coded RAM disc 100 and the bar-coded ROM disc 1700 are each a DVD, the total radial length of the control area 1720 and the user data area 1730 of the bar-coded ROM disc 1700 is 34.5 mm, whereas the radial length of the control area 120 of the bar-coded RAM disc 100 is 0.5 mm.

As can be appreciated from the description in (1), the optical spot cannot be once moved to the user data area 130 and to then perform one-track jumping to the control data area 120 for data reading. As can be appreciated from the description in (2), the radial length of the bar-coded RAM disc 100 in which the optical spot can move by one-track jumping is very limited.

As described above, the control data area 120 of the bar-coded RAM disc 100 cannot be accessed in a similar manner to in the conventional bar-coded ROM disc 1700. The present invention provides an optical disc apparatus suitable for accessing a control data area of a bar-coded RAM disc. As described below in detail, the present invention is applicable to a bar-coded ROM disc.

EXAMPLE 1

Figure 3:
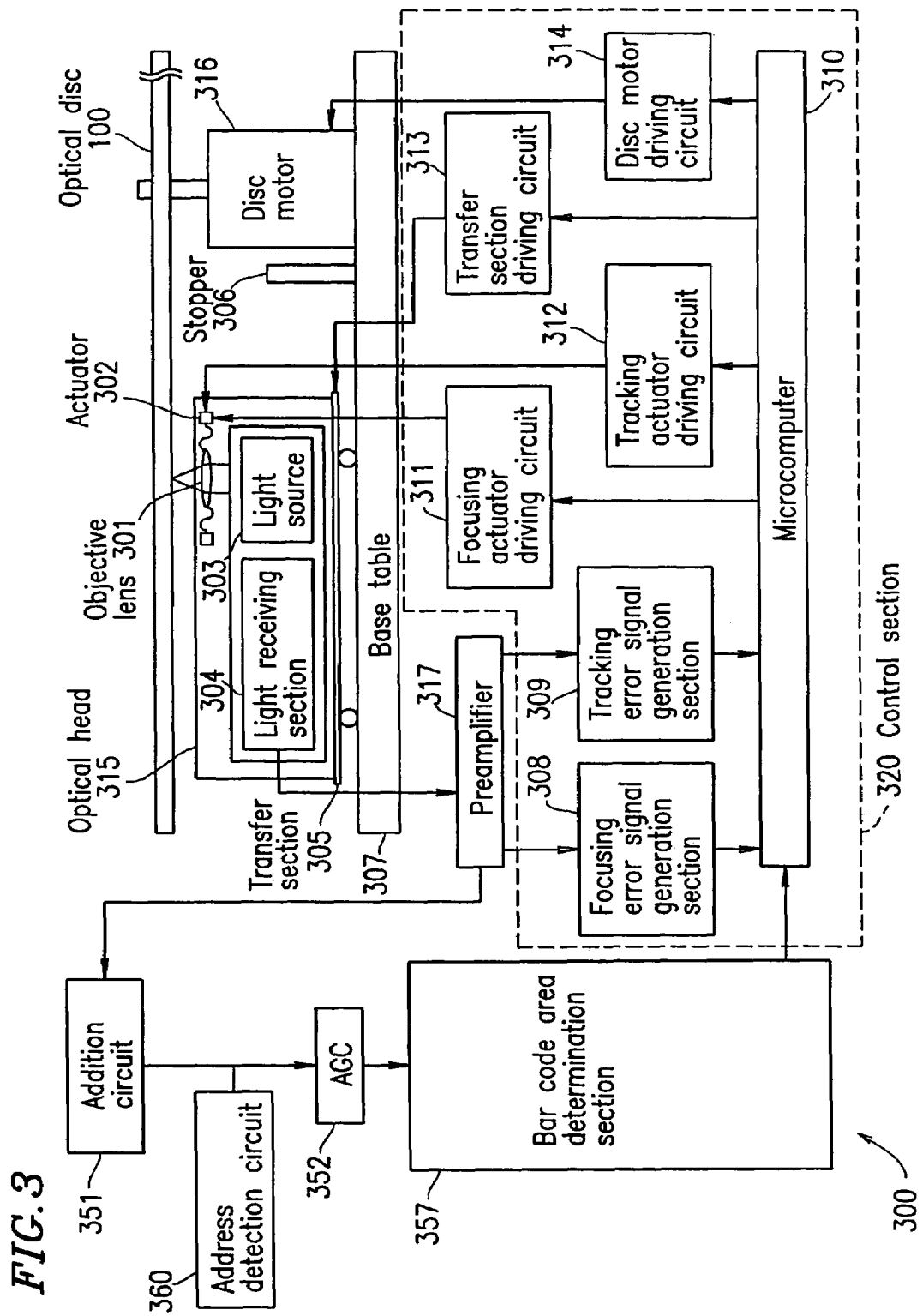
FIG. 3 is a block diagram illustrating a structure of an optical disc apparatus according to the present invention.

FIG. 3 is a block diagram illustrating a structure of an optical disc apparatus 300 according to a first example of the present invention for reading a signal from the bar-coded RAM disc 100.

When started, the optical disc apparatus 300 reproduces necessary data recorded in the control data area 120 of the bar-coded RAM disc 100 which is rotated by a disc motor 316. Then, the optical disc apparatus 300 records data in the user data area 130 or reproduces data recorded in the user data area 130.

An optical beam emitted by a light source 303 such as, for example, a laser is converged on a recording face of the bar-coded RAM disc 100 by a objective lens 301 so as to form an optical spot on the recording face. The light reflected by the bar-coded RAM disc 100 is received by a light receiving section 304. The light receiving section 304 generates a photoelectric current in accordance with the light received. The photoelectric current is output as a signal from a portion of the bar-coded RAM disc 100 on which the optical spot is formed.

An actuator 302 can drive the objective lens 301 in a direction substantially normal to a surface of the bar-coded RAM disc 100 (focusing direction) and in a radial direction of the bar-coded RAM disc 100 (tracking direction).

The objective lens 301, the actuator 302, the light source 303, and the light receiving section 304 are integrated as an optical head 315. The optical head 315 is mounted on a transfer section 305. By moving the transfer section 305, the optical head 315 is movable substantially in the radial direction of the bar-coded RAM disc 100. In FIG. 3, the transfer section 305 is shown as a carrying table, but is not limited to such a form. The transfer section 305 can move a base table 307 to an arbitrary position above the bar-coded RAM disc 100. On the base table 307, the disc motor 316 and a stopper 306 are fixed.

The stopper 306 limits the moving range of the transfer section 305 in the radial direction of the bar-coded RAM disc 100 in order to prevent the transfer section 305 from colliding against the disc motor 316. The optical disc apparatus 300 is arranged so that when the transfer section 305 contacts the stopper 306, the position of the optical spot from the optical head 315 substantially matches the inner periphery of the bar code area 110.

The focusing control, tracking control and transfer control of the optical disc apparatus 300 will be described in more detail.

A control section 320 controls the optical head 315. The control section 320 includes a focusing error signal generation section 308, a tracking error signal generation section 309, a microcomputer 310, a focusing actuator driving circuit 311, a tracking actuator driving circuit 312, a transfer section driving circuit 313, and a disc motor driving section 314.

The signal output from the light receiving section 304 is input to a preamplifier 317.

Based on the output from the preamplifier 317, the focusing error signal generation section 308 generates a focusing error signal. Based on the focusing error signal, the microcomputer 310 sends an instruction to the focusing actuator driving circuit 311. Based on the instruction from the microcomputer 310, the focusing actuator driving circuit 311 drives the actuator 302.

Also based on the output from the preamplifier 317, the tracking error signal generation section 309 generates a tracking error signal (a differential phase tracking error signal or a push-pull tracking error signal). Based on the tracking error signal, the microcomputer 310 sends an instruction to the tracking actuator driving circuit 312. Based on the instruction from the microcomputer 310, the tracking actuator driving circuit 312 drives the actuator 302.

Based on the output from the preamplifier 317, an addition circuit 351 generates an RF signal, and outputs the RF signal to an automatic gain control circuit (hereinafter, referred to as an "AGC") 352. The AGC 352 adjusts the amplitude of the RF signal within a prescribed range, and outputs the adjusted RF signal to a bar code area determination section 357.

The bar code area determination section 357 determines whether or not the RF signal from the AGC 352 is read from the bar code area 110 of the bar-coded RAM disc 100. In this example, the barcode area determination section 357 also acts as a control data area determination section for determining whether or not an RF signal from the AGC 352 is read from the control data area 120 of the bar-coded RAM disc 100. The bar code area determination section and the control data area determination section may be provided separately.

The bar code area determination section 357 outputs the determination result to the microcomputer 310. In the case where, for example, it is not desirable for the optical spot from the light source 303 to be located on the bar code area 110 and the bar code area determination section 357 determines that the RF signal is from the bar code area 110 (i.e., the optical spot is on the bar code area 110), the microcomputer 310 controls the transfer section driving circuit 313 to drive the transfer section 305 so that the optical spot is moved to another area.

An address detection circuit 360 detects an address of the position of the bar-coded RAM disc 100 at which the optical spot is located, based on the output from the addition circuit 351.

Figure 4:
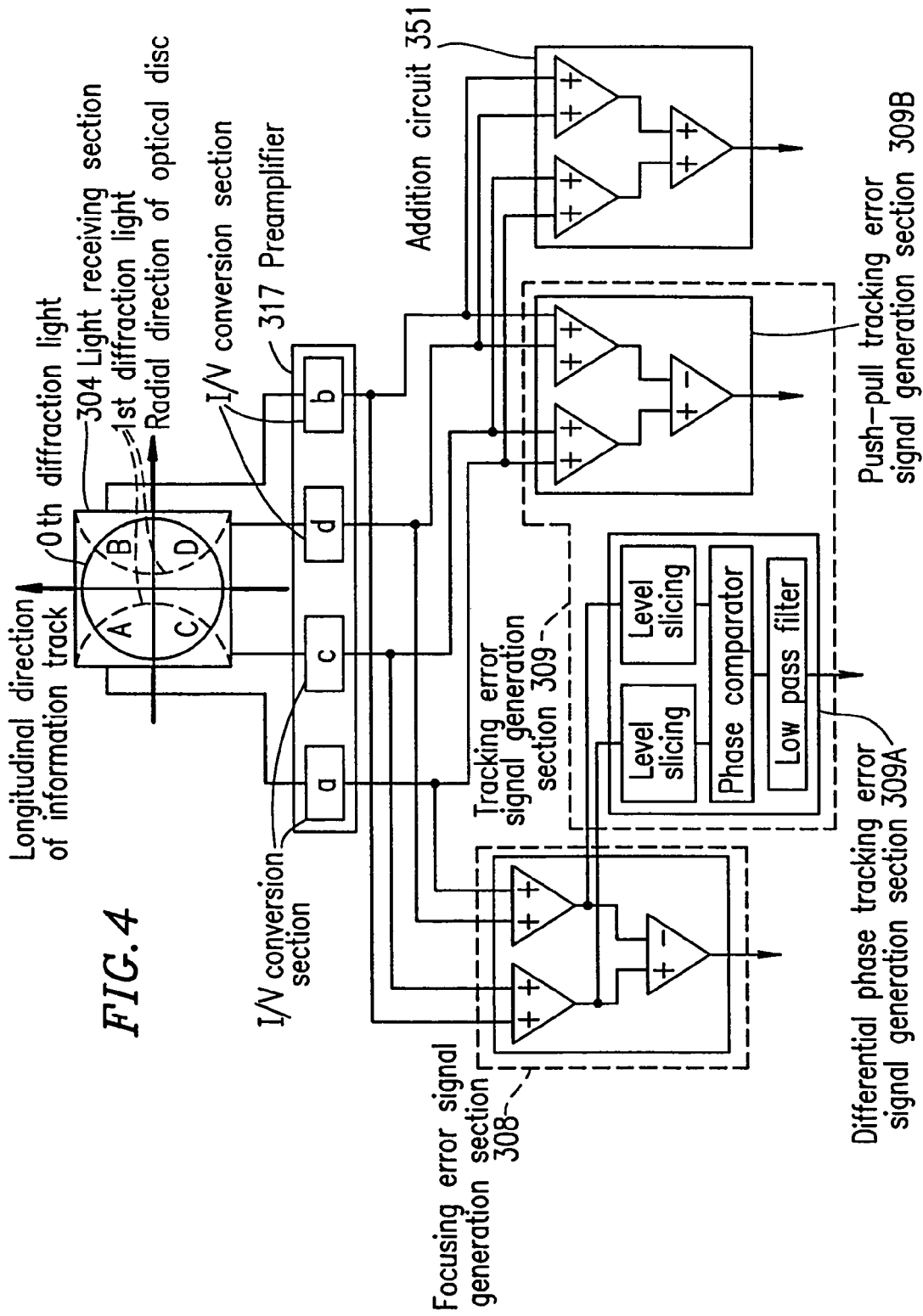
FIG. 4 is a block diagram illustrating a structure of a light receiving section, a preamplifier, a focusing error signal generation section, a tracking error signal generation section, and an addition circuit of the optical disc apparatus shown in FIG. 3.

FIG. 4 is a block diagram illustrating a structure of the light receiving section 304, the preamplifier 317, the focusing error signal generation section 308, the tracking error signal generation section 309, and the addition circuit 351. The tracking error signal generation section 309 includes a differential phase tracking error generation section 309A and a push-pull tracking error generation section 309B. The addition circuit 351 acts as an RF signal generation section.

As shown in FIG. 4, the light receiving section 304 is divided into four light receiving areas A, B, C and D. The four areas A, B, C and D each generate a photocurrent in accordance with an amount of light received. The light receiving areas A, B, C and D of the light receiving section 304 respectively correspond to I/V conversion sections a, b, c and d of the preamplifier 317. The light receiving areas A, B, C and D output the generated photocurrents to the corresponding I/V conversion sections a, b, c and d.

Focusing error control is performed as follows. A focusing error signal represents an error, in a direction normal to the surface of the bar-coded RAM disc 100, of the optical spot formed by emission by the light source 303 and convergence by the objective lens 301 with respect to the bar-coded RAM disc 100. The focusing error signal is generated by the focusing error signal generation section 308 based on an output signal from the preamplifier 317. The signal obtained by current-voltage conversion performed by the I/V conversion sections a, b, c and d of the preamplifier 317 is calculated as (a+d)−(b+c) by the focusing error signal generation section 308. Herein, a, b, c and d respectively represents outputs from the I/V conversion sections a, b, c and d. Thus, the focusing error signal is generated by such an astigmatic method.

The microcomputer 310 performs filter calculation such as, for example, phase compensation or gain compensation on the focusing error signal generated by the focusing error signal generation section 308. The microcomputer 310 outputs the resultant signal to the focusing actuator driving circuit 311. Based on a driving signal generated by the focusing actuator driving circuit 311, the actuator 302 drives the objective lens 301 so that the optical spot is in a prescribed convergence state with respect to the recording face of the bar-coded RAM disc 100. Thus, focusing control is realized.

Tracking control is performed as follows. A tracking error signal represents an error, in a radial direction of the bar-coded RAM disc 100, of the optical spot formed by emission by the light source 303 and convergence by the objective lens 301 with respect to one targeted information track 210 (FIG. 2). The tracking error signal is generated by the tracking error signal generation section 309 based on an output signal from the preamplifier 317. The error of the optical spot with respect to the information track 210 is obtained as follows. Light diffracted by the pits 220 is detected by the four light receiving areas A, B, C and D of the light receiving section 304. A signal showing phase information of the detected diffraction light represents the tracking error signal. The tracking error signal generation section 309 obtains the differential phase between (a+d) and (b+c) based on the detected light, and generates a differential phase tracking error signal (Japanese Laid-Open Publication No. 62-165737).

The microcomputer 310 performs, for example, phase compensation or gain compensation on the differential phase tracking error signal generated by the tracking error signal generation section 309. The microcomputer 310 outputs the resultant signal to the tracking actuator driving circuit 312. The tracking actuator driving circuit 312 drives the actuator 302 so that the optical spot accurately scans the information track 210 (FIG. 2). Thus, tracking control is realized.

Transfer control is performed as follows. The differential phase tracking error signal is low frequency region-compensated by the microcomputer 310 performing filter calculation. When the microcomputer 310 outputs a signal in the low frequency region to the transfer section driving circuit 313, the transfer section driving circuit 313 drives the transfer section 305 so that the optical beam passing through the center of the objective lens 301 passes through the center of the light receiving section 304. Thus, transfer control is realized.

Based on an output from the preamplifier 317, the addition circuit 351 adds all the outputs of the I/V conversion sections a, b, c and d, i.e., (a+b+c+d) so as to generates an RF signal. The AGC 352 receives the RF signal and adjusts the amplitude of the RF signal to be within a prescribed range. Then, the AGC 352 outputs the adjusted RF signal to the bar code area determination section 357.

Figure 5:
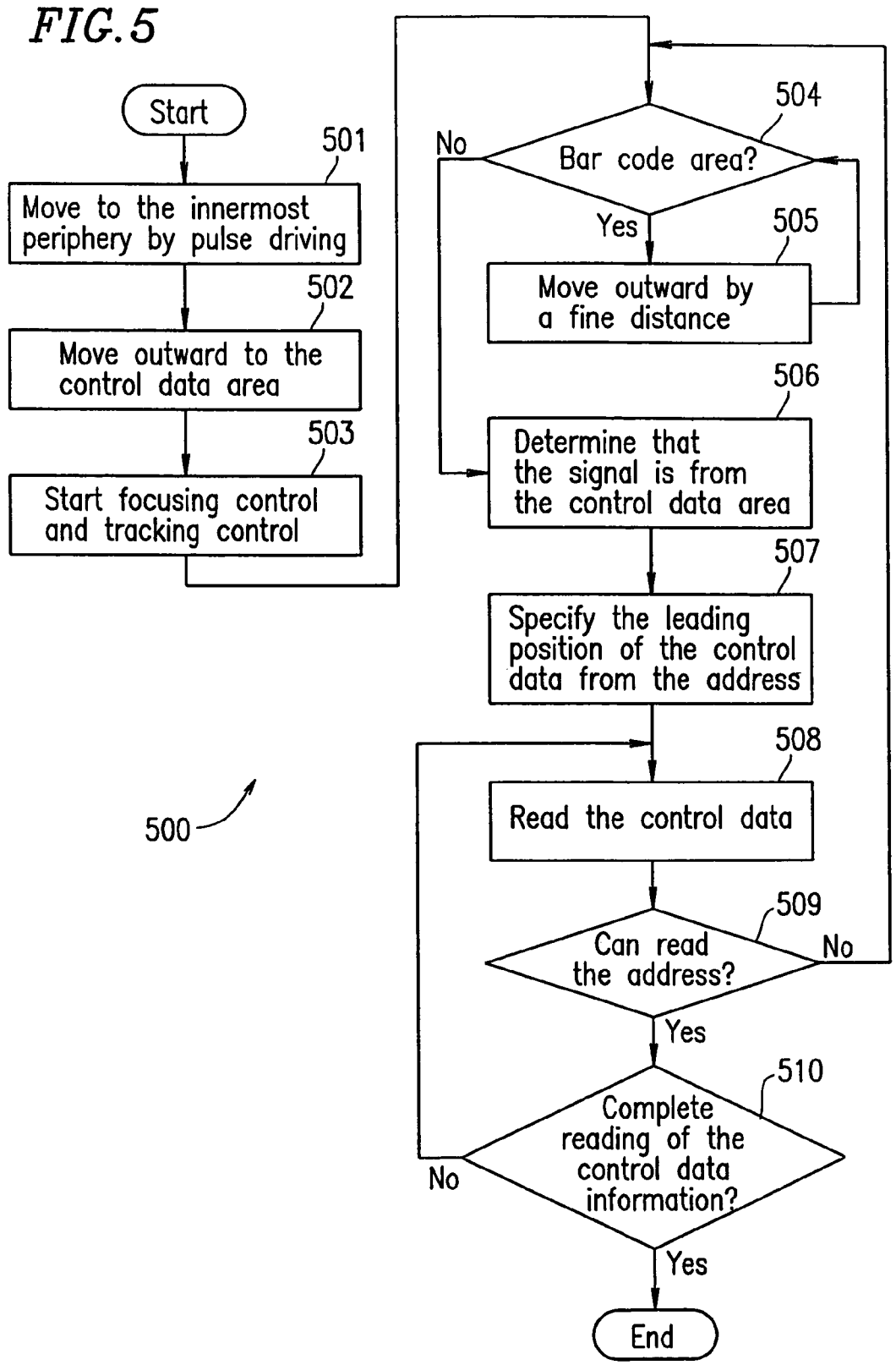
FIG. 5 is a flowchart illustrating an operation for accessing a control data area of a bar-coded RAM disc according to the present invention.

Hereinafter, an exemplary operation of the optical disc apparatus 100 according to the first example of the present invention for allowing the optical head 315 to access the control data area 120 of the bar-coded RAM disc 100 will be described with reference to FIG. 5. FIG. 5 is a flowchart 500 illustrating the operation.

First, the micro computer 310 instructs the disc motor driving circuit 314 to rotate the bar-coded RAM disc 100. Based on the instruction, the disc motor driving circuit 314 drives the disc motor 316. As a result, the disc motor 316 rotates the bar-coded RAM disc 100.

In step 501, the microcomputer 310 outputs a pulse driving signal to the transfer section driving circuit 313 in the state where tracking control is not performed. Based on the pulse driving signal, the transfer section driving circuit 313 moves the transfer section 305, having the optical head 315 mounted thereon, inward in the radial direction of the bar-coded RAM disc 100.

The stopper 306 is provided for preventing the optical spot from the light source 303 from moving inside an innermost periphery of the bar-coded RAM disc 100.

The pulse driving signal output by the microcomputer 310 to the transfer section driving circuit 313 has a length which is sufficient for the optical head 315 to return to the innermost periphery of the bar-coded RAM disc 100, wherever below the bar-coded RAM disc 100 the optical head 315 is positioned. The pulse driving signal is formed of pulses in order to restrict the moving speed of the optical head 315 from becoming too high. The transfer section 305 moves by way of the pulse driving signal at a speed which is sufficiently low to prevent the transfer section 305 from rebounding in an opposite direction in the event of a collision, i.e., rebounding outward in a radial direction of the bar-coded RAM disc 100 due to a counteraction of colliding against the stopper 306. Thus, the optical head 315 moves to the innermost periphery of the bar-coded RAM disc 100 by the pulse driving signal.

In step 502, after the transfer section 305 moves to the innermost periphery of the bar-coded RAM disc 100, the microcomputer 310 outputs a driving signal to the transfer section driving circuit 313 so that the optical spot formed on the bar-coded RAM disc 100 moves to the control data area 120. Since the control data area 120 is a very narrow area as described above and a controlling error in moving the optical spot also needs to be considered, it is difficult to directly move the transfer section 305 to the control data area 120. According to the first example of the present invention, the transfer section 305 is driven to move to the ROM area 140 (FIG. 1).

Figure 6:
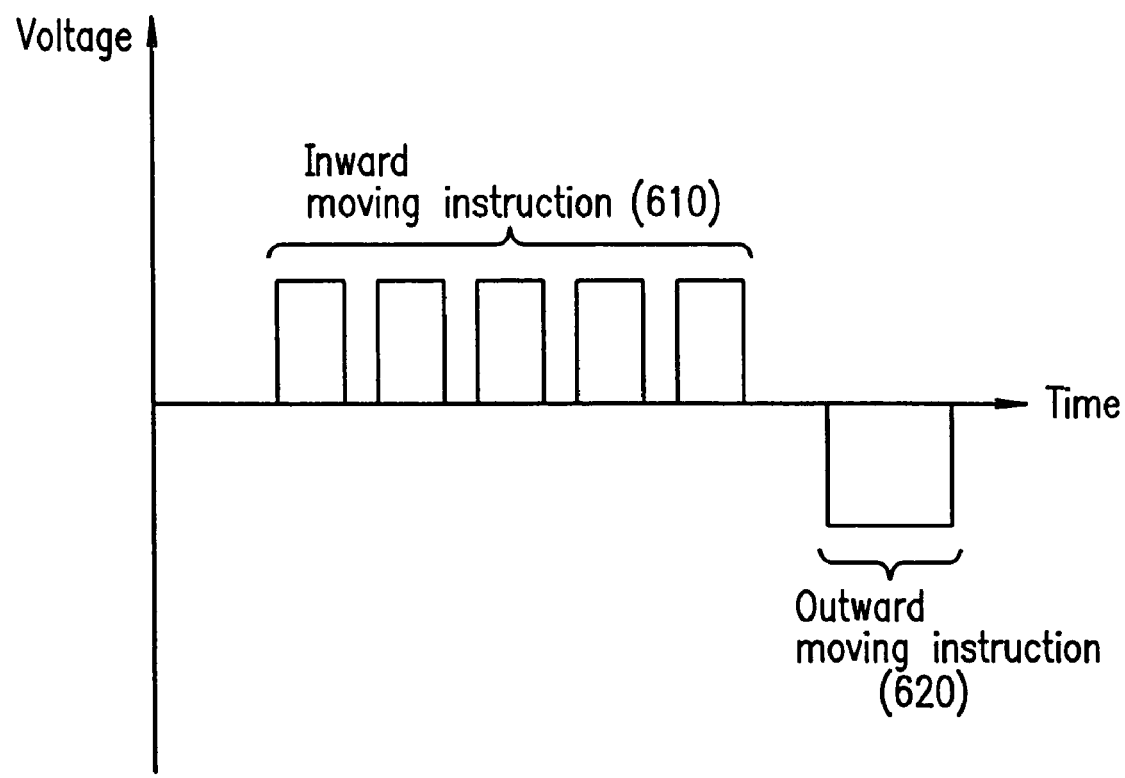
FIG. 6 is a waveform diagram illustrating signals for driving a transfer section driving circuit included in the optical disc apparatus shown in FIG. 3.

FIG. 6 is a waveform diagram of the driving signals output by the microcomputer 310 to the transfer section driving circuit 313 in steps 501 and 502. In FIG. 6, the horizontal axis represents the time, and the vertical axis represents the voltage. The driving signal output by the microcomputer 310 in step 501 includes a plurality of relatively short pulses. The plurality of relatively short pulses represent an inward moving instruction 610 for moving the transfer section 305 to the innermost periphery of the bar-coded RAM disc 100. The driving signal output by the microcomputer 310 instep 502 is one pulse having an arbitrary length. The pulse represents an outward moving instruction 620 for moving the transfer section 305 from the innermost periphery to a desired position of the bar-coded RAM disc 100. In FIG. 6, the sign of the plurality of pulses representing the inward moving instruction 610 is different from the sign of the pulse representing the outward moving instruction 620, since the direction in which the transfer section 305 moves in response to the inward moving instruction 610 is different from the direction in which the transfer section 305 moves in response to the outward moving instruction 620.

In step 503 (FIG. 5), after the optical head 315 moves as described above, the microcomputer 310 performs focusing control and tracking control so as to cause the optical spot to follow the information track 210.

In step 504, the bar code area determination section 357 determines whether or not the optical spot is in the bar code area 110, i.e., whether or not the signal output by the optical head 315 is read from the bar code area 110.

When the bar code area determination section 357 determines that the signal output by the optical head 315 is read from the bar code area 110 ("Yes" in step 504), in step 505, the microcomputer 310 instructs the transfer section driving circuit 313 to move the transfer section 305 outward by a fine distance, instead of reading an address. Thus, the optical head 315 mounted on the transfer section 305 moves outward, i.e., toward the control data area 120, by the fine distance. Then, the optical head 315 reads a signal from the bar-coded RAM disc 100. The operation goes back to step 504, where the barcode area determination section 357 determines that the signal output by the optical head 315, after moving, is read from the bar code area 110. The operation of steps 504 and 505 is repeated until the bar code area determination section 357 determines that the signal output by the optical head 315 is not read from the bar code area 110.

The reason why it is determined whether or not the signal output by the optical head 315 is read from the bar code area 110 is because an address representing a position in the bar code area 110 is not reliable.

When the bar code area determination section 357 determines that the signal output by the optical head 315 is not read from the bar code area 110 ("No" in step 504), in step 506, the bar code area determination section 357 determines that the signal output by the optical head 315 is read from the control data area 120. The reason is because the bar-coded RAM disc 100 includes the control data area 120 adjacent to the bar code area 110. The operation of the bar code area determination section 357 is the same even when the control data area determination section determines that the signal output from the optical head 315 is read from the control data area 120.

Then, in step 507, the optical head 315 reads a signal from the control data area 120 and detects the an address of the optical spot on the bar-coded RAM disc 100 by the address detection circuit 360. From this address, a leading position of the control data area 120 can be specified.

Next, the optical head 315 is controlled to perform one-track jumping to move the optical spot to the leading position of the control data area 120. Then, necessary control data information is read. In this specification, the control data information includes control data recorded in the control data area 120 and an address at which the control data is recorded.

In step 508, the optical head 315 reads control data. In step 509, the optical head 315 reads an address at which the control data is recorded. When, in step 509, the optical spot goes back to the bar code area 110 due to an external impact or the like before the optical head 315 reads the address, the optical head 315 cannot read the address ("No" in step 509). In this case, the optical spot is moved from the bar code area 110 to the control data area 120 and repeats the operation of steps 504 through 509.

After the control data is read in step 508 and the address is read in step 509, the optical head 315, in step 510, determines whether or not reading of the control data information is completed. When the reading of the control data information is not completed ("No" in step 510), the operation goes back to step 508, and the operation of steps 508 through 510 is repeated. When the reading of the control data information is completed ("Yes" in step 510), the operation of the flowchart 500 is terminated.

Hereinafter, a specific structure of the bar code area determination section 357 will be described.

Figure 7A:
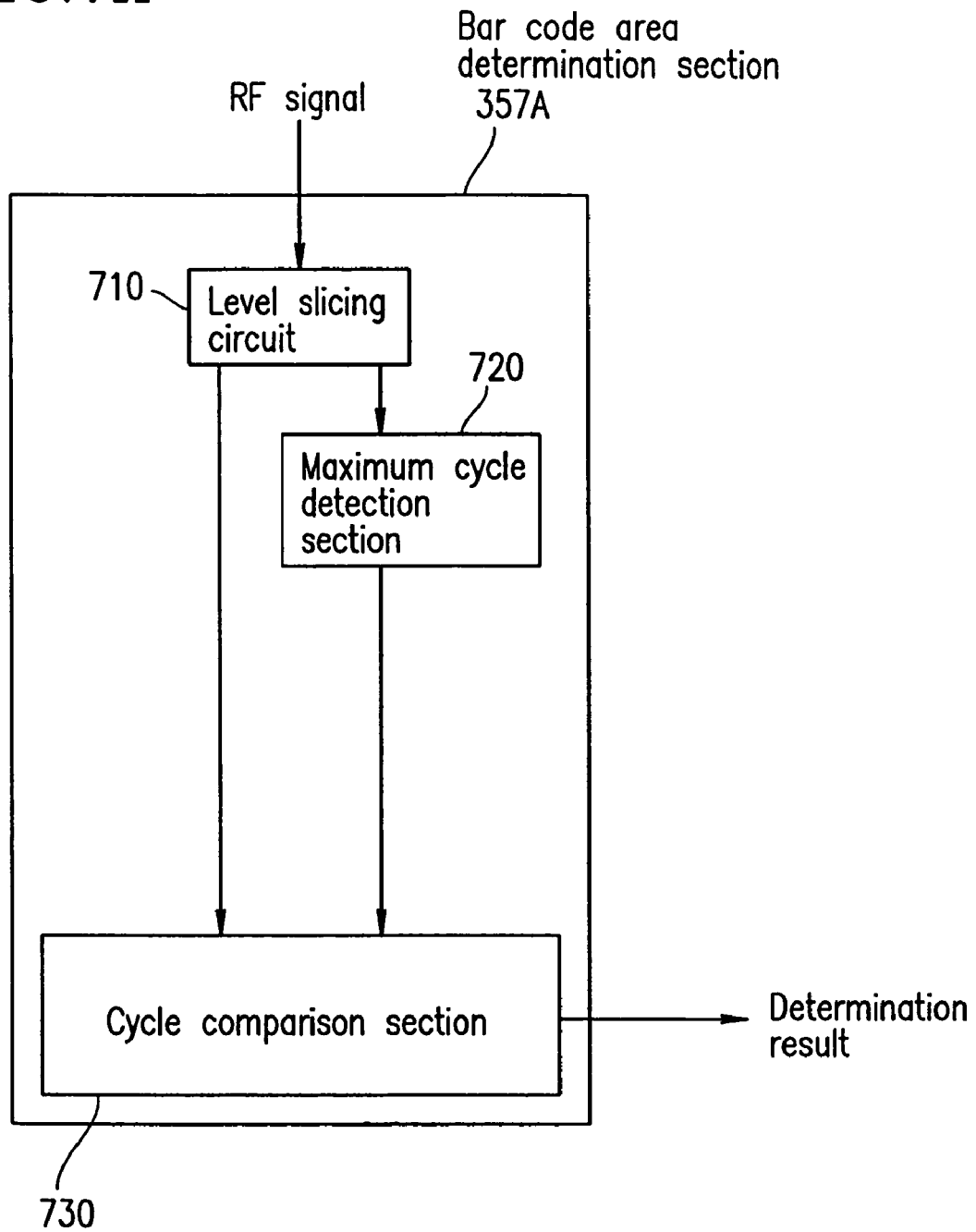
FIG. 7A is a block diagram illustrating a detailed structure of a bar code area determination section according to a first example of the present invention.

FIG. 7A shows a structure of a bar code area determination section 357A, as one example of the bar code area determination section 357, in detail. The barcode area determination section 357A includes a level slicing circuit 710, a maximum cycle detection section 720, and a cycle comparison section 730.

In this example, the bar code area determination section 357A determines whether or not the signal output by the optical head 315 is read from the bar code area 110 based on whether or not the cycle of the signal output by the optical head 315 is longer than a set cycle, which is the maximum cycle of cycles of a signal read from the control data area 120.

In the case where the bar-coded RAM disc 100 is an 8/16 modulated DVD, the maximum cycle of the cycles of the signal read from the control data area 120 is 18T and the longest mark length (corresponding to the length of the maximum pits among the pits 220; hereinafter, referred to as a "maximum pit length") is 14T. Here, "T" represents a read clock cycle.

Generally, the cycle of a signal read from the bar code area 110 is longer than the maximum cycle 18T of the signal read from the control data area 120. This is determined by the Standards in order to separate the frequency region of an 8/16 modulated signal read from the control data area 120 and a signal read from the bar code 150 of the bar code area 110.

Referring back to FIG. 3, the addition circuit 351 receives a signal output from the optical head 315 through the preamplifier 317 and generates an RF signal. The RF signal is input to the bar code area determination section 357 through the AGC 352.

As shown in FIG. 7A, the RF signal is input to the level slicing circuit 710. The level slicing circuit 710 slices the levels of the RF signal at a prescribed level.

FIG. 8 shows an exemplary waveform of the level-sliced RF signal in the case where the RF signal is a random signal. In the case where the bar-coded RAM disc 100 is an 8/16 modulated DVD, the maximum cycle of the cycles of the signal read from the control data area 120 is 18T and the maximum pit length is 14T, as described above. A minimum mark length of a signal read from the control data area 120 is 3T.

Referring to FIG. 7A again, the maximum cycle detection section 720 receives the level-sliced RF signal. The maximum cycle detection section 720 detects the maximum cycle of an H level and an L level (i.e., the maximum period between a rise and the next rise, or the maximum period between a fall and the next fall) of the received RF signal in a prescribed time period.

The prescribed time period for the maximum cycle detection section 720 to detect the maximum cycle needs to be a time period which is sufficient to detect a signal by at least one bar code 150 (FIG. 1). In the case where, for example, the bar-coded RAM disc 100 is a DVD, the prescribed time period needs to at least correspond to a time period required for the DVD to perform $11/120$ of a rotation.

The reason is because the Standards define that the range in which a bar code 150 is recorded in a DVD corresponds to a disc rotation speed of 1440 rpm, a read clock cycle of 8.89 μsec., and bar code data having a capacity in the range of 2601 bytes through 73441 bytes. In other words, one bar code 150 exists in an angle corresponding to $1/11.5$ to $1/2.20$ of a rotation of the DVD.

The cycle comparison section 730 compares the maximum cycle detected by the maximum cycle detection section 720 and the set cycle, and determines whether or not the RF signal is read from the control data area 120. As described above, in the case where the bar-coded RAM disc 100 is an 8/16 modulated DVD, the maximum cycle of the cycles of the signal read from the control data area 120 is 18T. The maximum cycle of cycles of a signal read from the bar code area 110 is larger than 18T.

Where, for example, 18T is set as the set cycle in the cycle comparison section 730, the cycle comparison section 730 compares the maximum cycle detected by the maximum cycle detection section 720 and 18T. When the maximum cycle is larger than 18T, the cycle comparison section 730 determines that the RF signal is read from the bar code area 110. When the maximum cycle is equal to or less than 18T, the cycle comparison section 730 determines that the RF signal is read from the control data area 120. In this manner, the bar code area determination section 357A can determine whether the RF signal (i.e., the signal read by the optical head 315) is from the bar code area 110 or the control data area 120.

The maximum cycle detected by the maximum cycle detection section 720 may be compared with a value of 20T, which is larger than the set cycle of 18T or a greater, in consideration of the detection error. Herein, when the maximum cycle is compared with a value of 20T or greater and determined to be greater than that value in the case where the bar-coded RAM disc 100 is an 8/16 modulated DVD, the maximum cycle is regarded as being sufficiently large as compared with the set cycle.

Figure 7B:
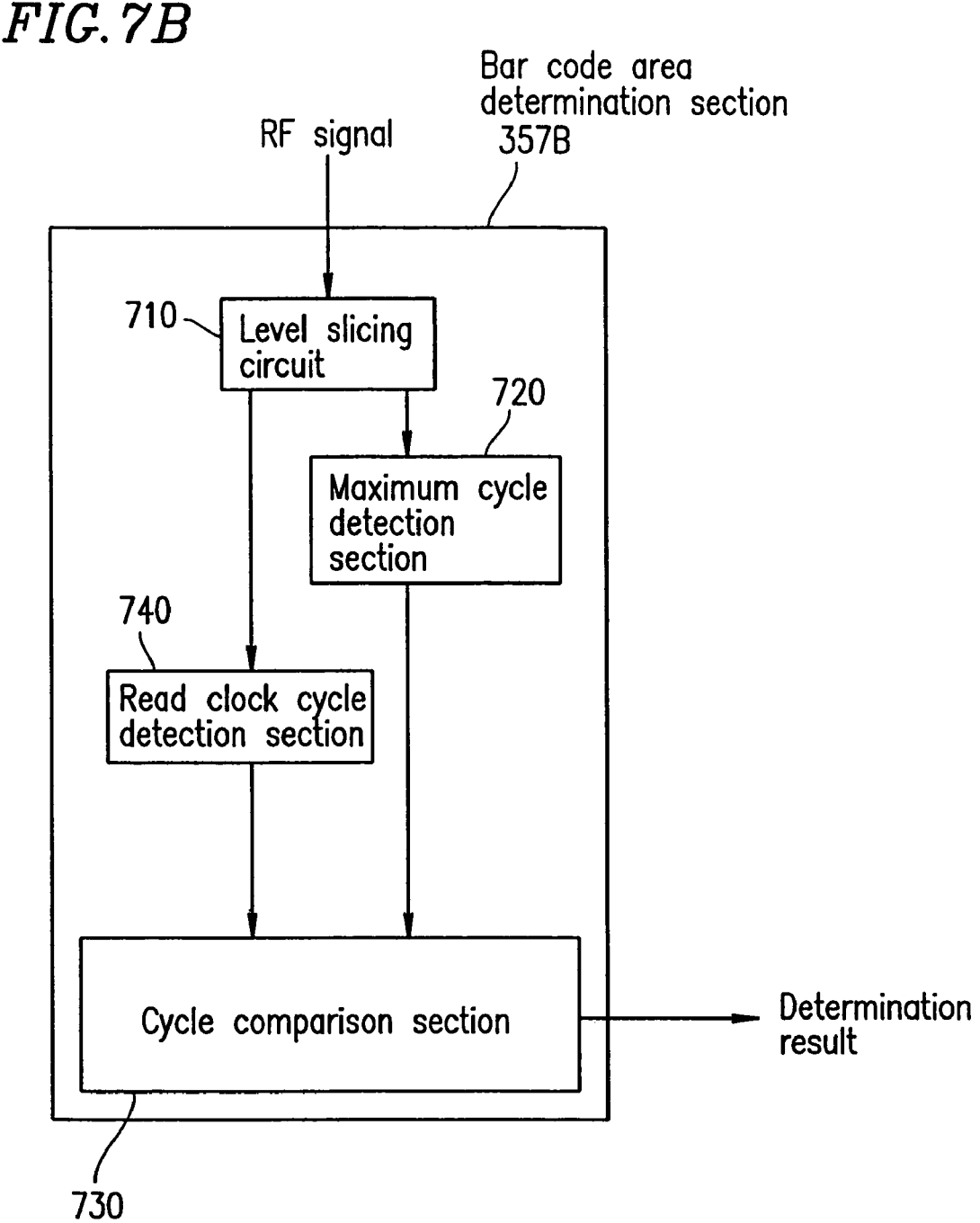
FIG. 7B is a block diagram illustrating a detailed structure of another bar code area determination section according to a first example of the present invention.

FIG. 7B shows a structure of a bar code area determination section 357B as another example of the bar code area determination section 357, in detail. The barcode area determination section 357B includes a level slicing circuit 710, a maximum cycle detection section 720, a cycle comparison section 730, and a read clock cycle detection section 740. The bar code area determination section 357B has substantially the same structure as that of the bar code area determination section 357A (FIG. 7A) except for further including the read clock cycle detection section 740.

The read clock cycle detection section 740 receives an RF signal level-sliced by the level slicing circuit 710 and generates a read clock cycle. The read clock cycle detection section 740 detects a read clock cycle by, for example, a phase locked loop (PLL).

Based on the maximum cycle detected by the maximum cycle detection section 720 and the read clock cycle generated by the read clock cycle detection section 740, the cycle comparison section 730 can find how many read clock cycles correspond to the maximum cycle. Hereinafter, the number of read clock cycles corresponding to the maximum cycle will be referred to as a "maximum clock number".)

Then, in the case where, for example, the bar-coded RAM disc 100 is an 8/16 modulated DVD, a coefficient 18, for example, is set as a set clock coefficient in the cycle comparison section 730. The cycle comparison section 730 compares the maximum clock number and the set clock coefficient. When the maximum clock number is larger than the set clock coefficient, the cycle comparison section 730 determines that the RF signal is read from the bar code area 110. When the maximum clock number is equal to or less than the set clock coefficient, the cycle comparison section 730 determines that the RF signal is read from the control data area 120.

In this manner, the bar code area determination section 357B can determine whether the RF signal (i.e., the signal read by the optical head 315) is from the bar code area 110 or the control data area 120.

In the first example, the determination on whether the optical spot is positioned on the bar code area 110 or the control data area 120 is continued until the optical head 315 accesses the control data area 120 and completes reading of the control data information from the control data area 120. Therefore, the optical spot obtained by the optical head 315 can be stably positioned on the control data area. As a result, the operation stability of the optical disc apparatus 300 when the optical disc apparatus 300 is started is significantly improved.

EXAMPLE 2

An optical disc apparatus according to a second example of the present invention is similar to the optical disc apparatus 300 shown in FIG. 3 except for the structure of a barcode area determination section. Identical elements to those of the optical disc apparatus 300 will not be described for the sake of simplicity.

Figure 9A:
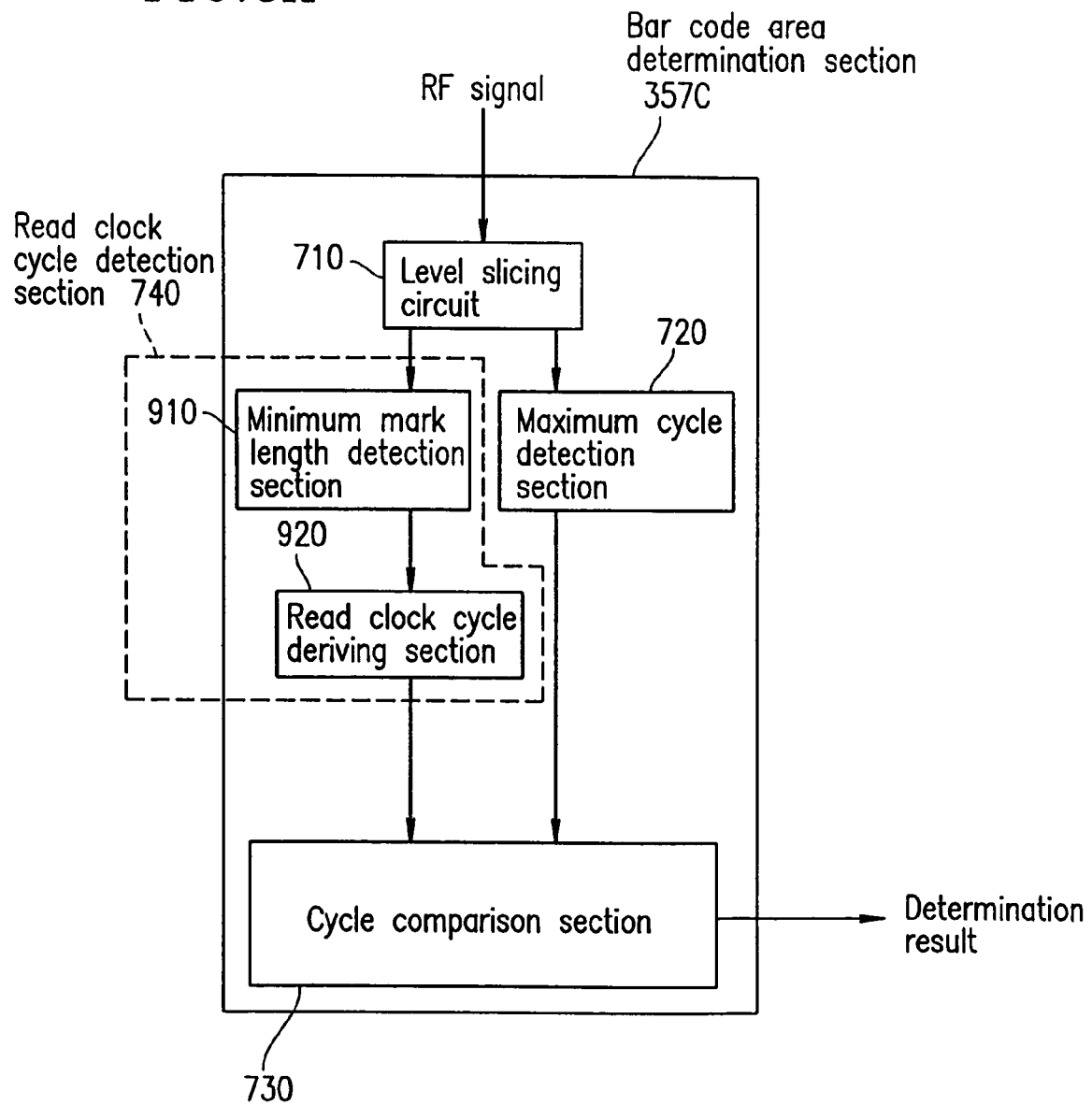
FIG. 9A is a block diagram illustrating a detailed structure of a bar code area determination section according to a second example of the present invention.

FIG. 9A shows a structure of a bar code area determination section 357C in the second example. The bar code area determination section 357C has substantially the same structure as that of the bar code area determination section 357B shown in FIG. 7B except that the bar code area determination section 357C includes a minimum mark length detection section 910 and a read clock cycle deriving section 920. The minimum mark length detection section 910 and the read clock cycle deriving section 920 act together similarly to the read clock cycle deriving section 740 shown in FIG. 7B.

The minimum mark length detection section 910 receives an RF signal level-sliced by the level slicing circuit 710 and detects the time period of the minimum mark length having only an H level or an L level within a prescribed time period. The prescribed time period is a time period required by the bar code area determination section 357C to detect at least one bar code 150 (FIG. 1).

The read clock cycle deriving section 920 derives a read clock cycle T based on the minimum mark length detected by the minimum mark length detection section 910.

In the case where, for example, the bar-coded RAM disc 100 is an 8/16 modulated DVD, the minimum mark length of a signal read from the control data area 120 is 3T ("T" is a read clock cycle). The read clock cycle deriving section 920 performs the calculation of the minimum mark length÷3=T so as to derive the read clock cycle T. Thus, in the second example, the read clock cycle T is derived based on the minimum mark length.

The derived read clock cycle is used in a similar manner to that described regarding the bar code area determination section 357B. Specifically, the cycle comparison section 730 obtains the maximum clock number based on the maximum cycle detected by the maximum cycle detection section 720 and the derived read clock cycle. The cycle comparison section 730 then compares the maximum clock number and the set clock coefficient. When the maximum clock number is larger than the set clock coefficient, the cycle comparison section 730 determines that the RF signal is read from the bar code area 110. The determination result is output to the microprocessor 310. When the maximum clock number is equal to or less than the set clock coefficient, the cycle comparison section 730 determines that the RF signal is read from the control data area 120 (or an area other than the bar code area 110). The determination result is output to the microprocessor 310. As described above, in the case where the bar-coded RAM disc 100 is an 8/16 modulated DVD, the set clock coefficient is 18, but the maximum clock number is preferably compared with a value of 20 or greater in consideration of the detection error.

In the second example, even when the PLL is unstable and the read clock cycle T cannot be stably detected by the PLL, the read clock cycle T can be derived from the RF signal detected. Thus, it can be determined whether or not the optical spot obtained by the optical head 315 is positioned on the bar code area 110.

EXAMPLE 3

An optical disc apparatus according to a third example of the present invention is similar to the optical disc apparatus 300 shown in FIG. 3 except for the structure of a bar code area determination section. Identical elements to those of the optical disc apparatus 300 will not be described for the sake of simplicity.

Figure 9B:
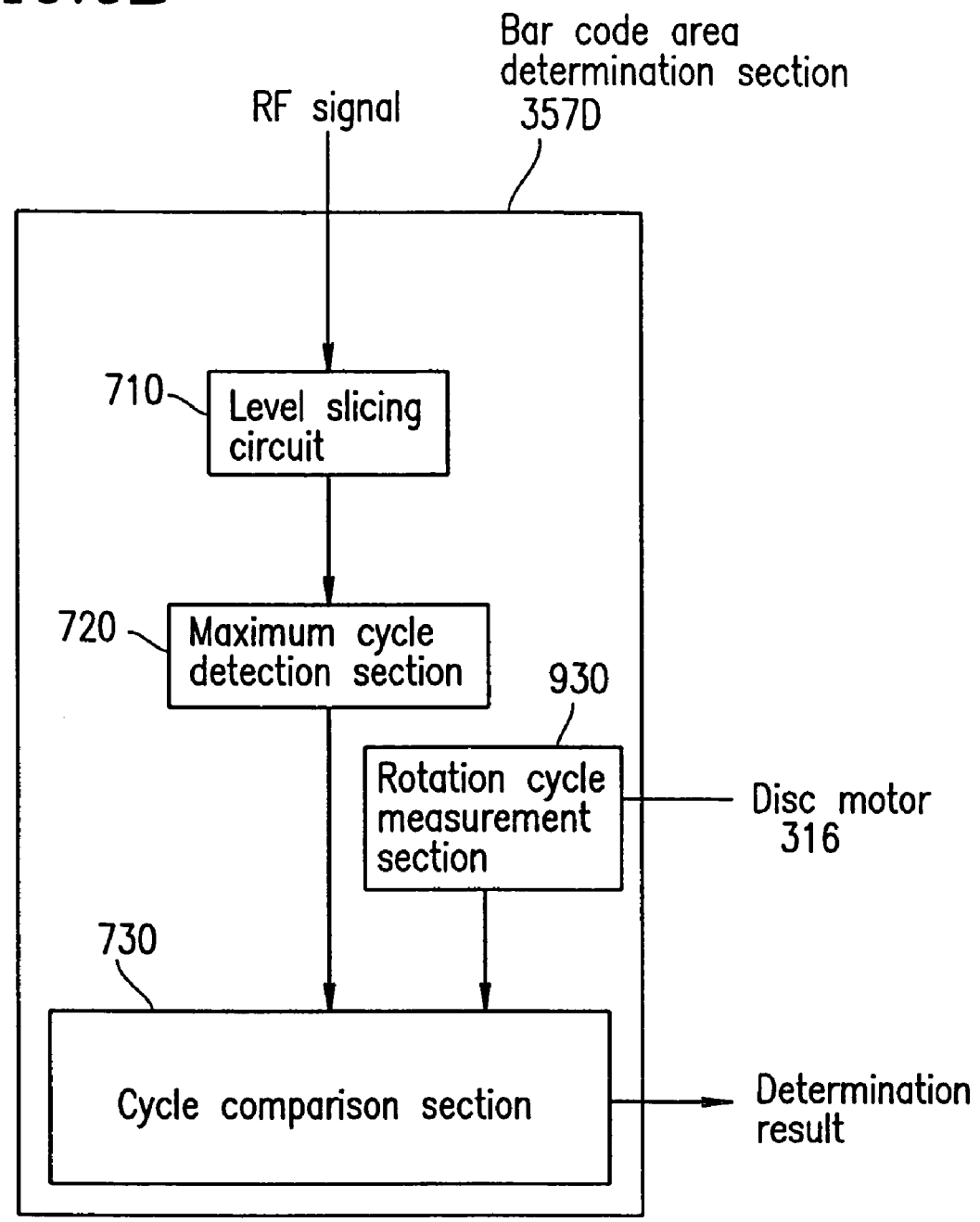
FIG. 9B is a block diagram illustrating a detailed structure of a bar code area determination section according to a third example of the present invention.

FIG. 9B shows a structure of a bar code area determination section 357D in the third example. The bar code area determination section 357D has substantially the same structure as that of the bar code area determination section 357A shown in FIG. 7A except that the bar code area determination section 357D includes a rotation cycle measurement section 930.

The rotation cycle measurement section 930 is connected to the disc motor 316 (FIG. 3) and measures a rotation cycle of the bar-coded RAM disc 100 rotated by the disc motor 316.

The cycle comparison section 730 can determine whether the optical spot from the optical head 315 is positioned in the bar code area 110 by comparing the maximum cycle of the RF signal detected by the maximum cycle detection section 720 and the rotation cycle measured by the rotation cycle measurement section 930.

The relationship between the maximum cycle of an RF signal read by the optical head 315 from the control data area 120 and the rotation cycle of the bar-coded RAM disc 100 is predetermined. Such a relationship is different from the relationship between the maximum cycle of an RF signal read by the optical head 315 from the bar code area 110 and the rotation cycle of the bar-coded RAM disc 100. Accordingly, in the third example, it can be determined whether or not the optical spot obtained by the optical head 315 is positioned on the bar code area 110 based on the relationship between the maximum cycle of the RF signal and the rotation cycle of the bar-coded RAM disc 100.

EXAMPLE 4

An optical disc apparatus according to a fourth example of the present invention is similar to the optical disc apparatus 300 shown in FIG. 3 except for the structure of a bar code area determination section. Identical elements to those of the optical disc apparatus 300 will not be described for the sake of simplicity. In the fourth example, a smoothed signal is generated by smoothing an RF signal, and a time period in which the level of the smoothing signal changes by at least a prescribed level is compared with a preset time period. Based on the comparison result, it is determined whether or not the RF signal is from the bar code area 110.

Figure 10:
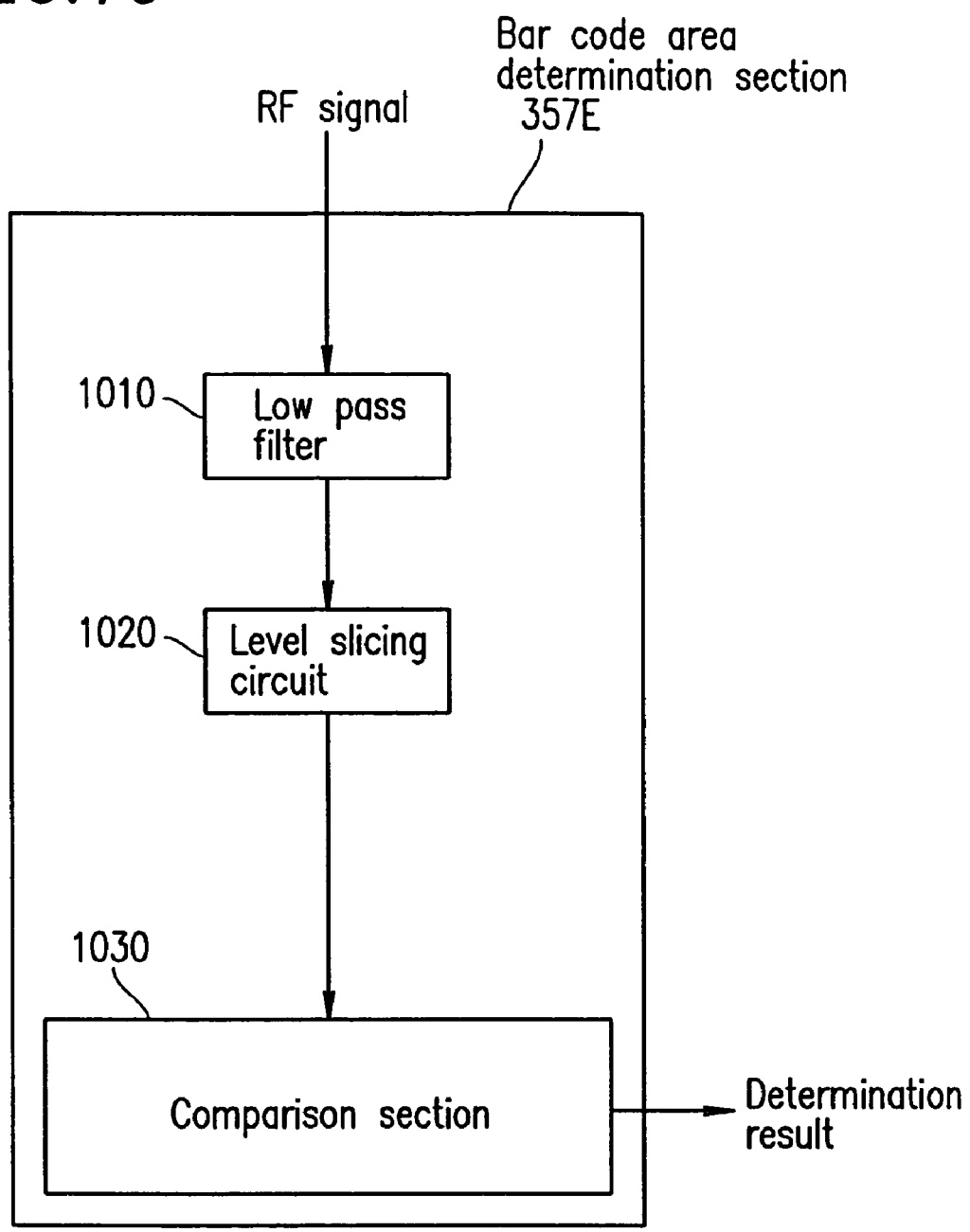
FIG. 10 is a block diagram illustrating a detailed structure of a bar code area determination section according to a fourth example of the present invention.

FIG. 10 shows a structure of a bar code area determination section 357E in the fourth example. The bar code area determination section 357E includes a low pass filter 1010, a level slicing circuit 1020, and a comparison section 1030.

Figure 11:
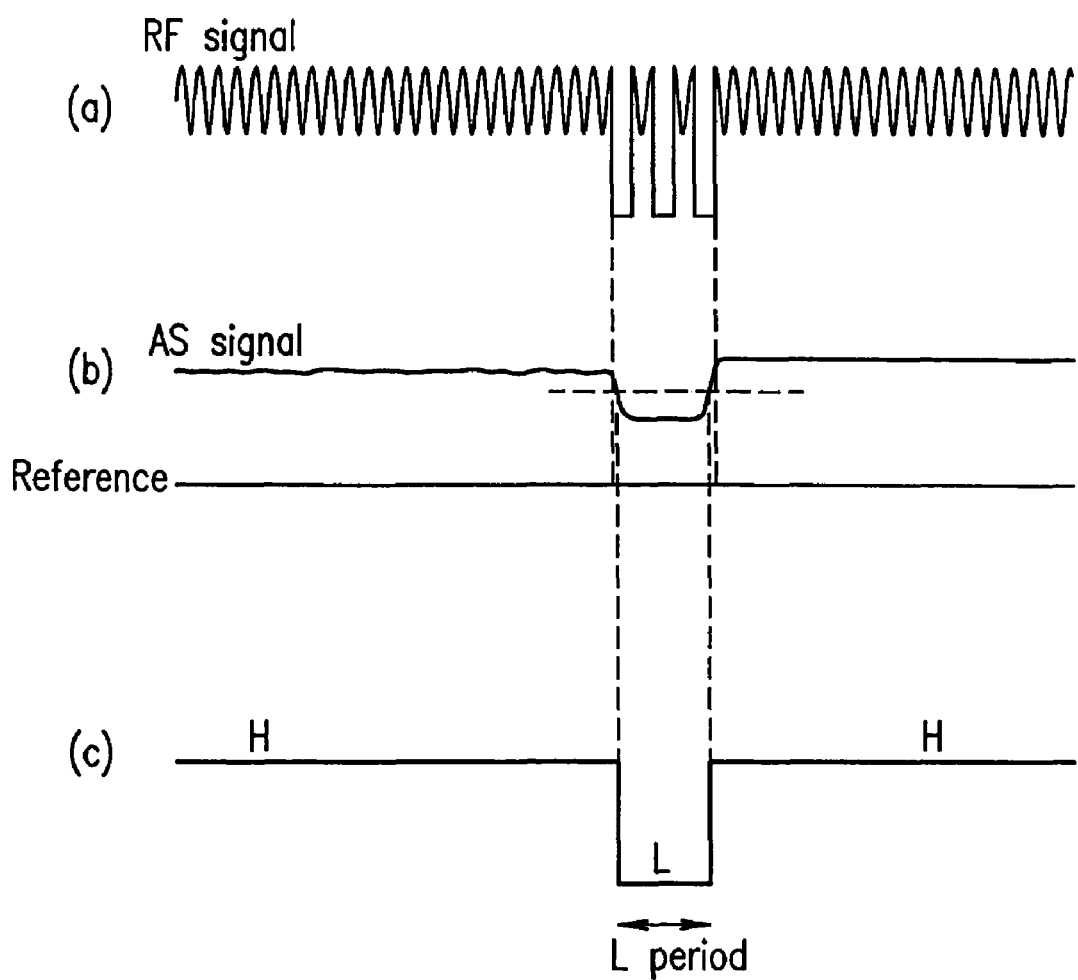
FIG. 11 is a waveform diagram illustrating waveform shaping performed by the bar code area determination section shown in FIG. 10.

FIG. 11 is a waveform diagram illustrating signal changes in the bar code area determination section 357E.

An RF signal as shown in part (a) of FIG. 11 is input to the low pass filter 1010. The low pass filter 1010 generates an AS signal as shown in part (b) of FIG. 11 by smoothing the RF signal. The low pass filter 1010 acts as a smoothing section, and the AS signal acts as a smoothed signal. The AS signal is obtained by removing a frequency component of a frequency corresponding to the set cycle (e.g., 18T) or greater.

The level slicing circuit 1020 receives the AS signal and level-slices the AS signal at a prescribed level into an H level and an L level. As a result, a level-sliced AS signal shown in part (c) of FIG. 11 is obtained. The level-sliced AS signal is output to the comparison section 1030.

The comparison section 1030 measures a time period in which the level-sliced AS signal is at the L level. When the resultant period is longer than a prescribed time period, the comparison section 1030 determines that the RF signal which is input to the bar code area determination section 357E is read from the bar code area 110.

In general, only a smoothed signal obtained from an RF signal read from the bar code area 110 changes by at least a prescribed level. A smoothed signal obtained from an RF signal read from the control data area 120 does not change. Accordingly, in this example, the bar code area determination section 375E can determine whether or not the RF signal is read from the bar code area 110 based on the time period in which the smoothed signal changes by at least the prescribed level.

In the fourth example, it is not necessary to detect a read clock cycle by a PLL. Therefore, even when the PLL is unstable and the read clock cycle T cannot be stably detected by the PLL, it can be accurately determined whether or not a signal output by the optical head 315 is read from the bar code area 110.

EXAMPLE 5

An optical disc apparatus according to a fifth example of the present invention is similar to the optical disc apparatus 300 shown in FIG. 3 except for the structure of a bar code area determination section. Identical elements to those of the optical disc apparatus 300 will not be described for the sake of simplicity.

Figure 12:
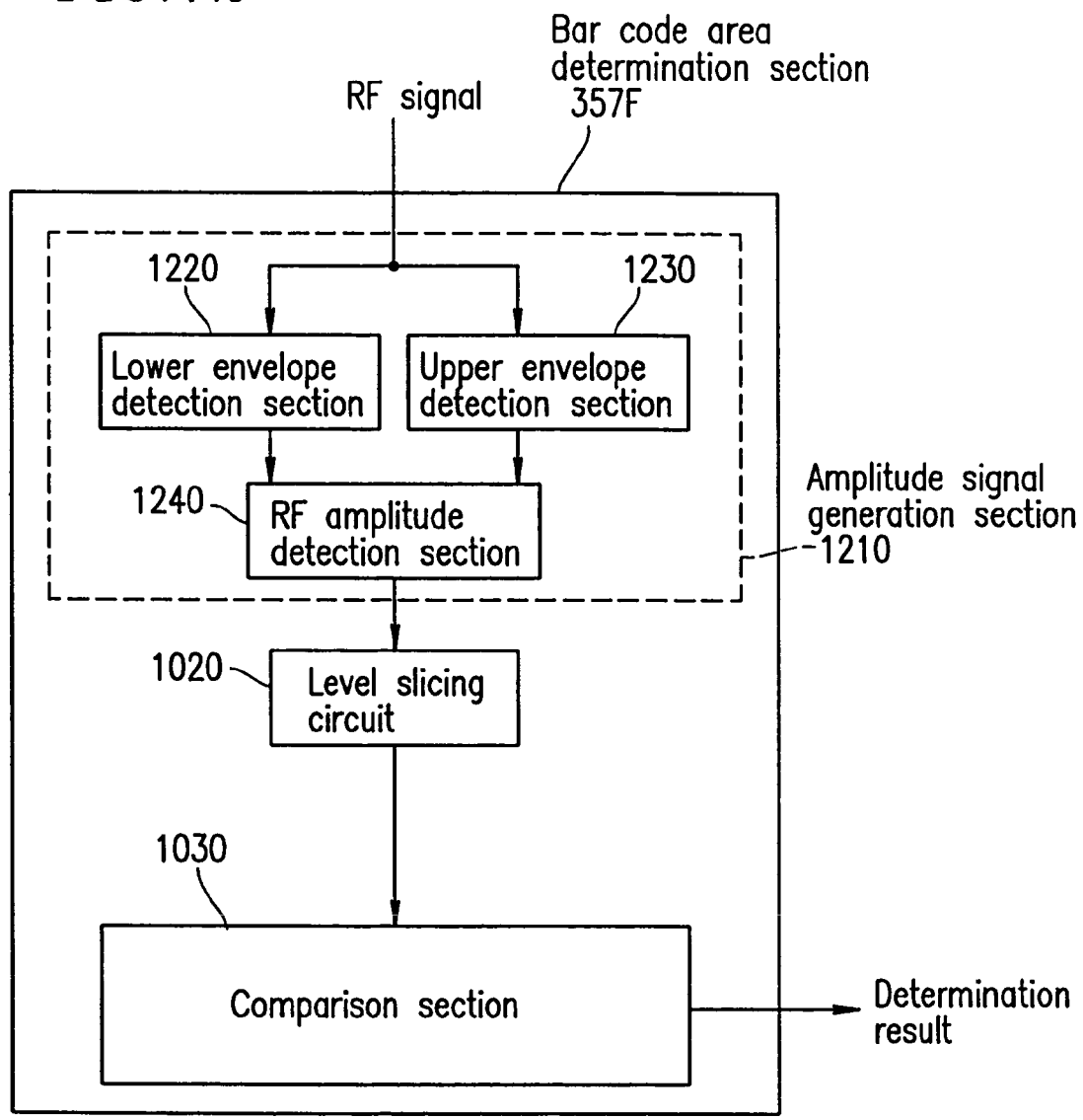
FIG. 12 is a block diagram illustrating a detailed structure of a bar code area determination section according to a fifth example of the present invention.

FIG. 12 shows a structure of a bar code area determination section 357F in the fifth example. The bar code area determination section 357F has substantially the same structure as that of the bar code area determination section 357E shown in FIG. 10 except that the bar code area determination section 357F includes an amplitude signal generation section 1210 in place of the low pass filter 1010. The amplitude signal generation section 1210 includes an upper envelope detection section 1220, a lower envelope detection section 1230 and an RF amplitude detection section 1240.

Figure 13:
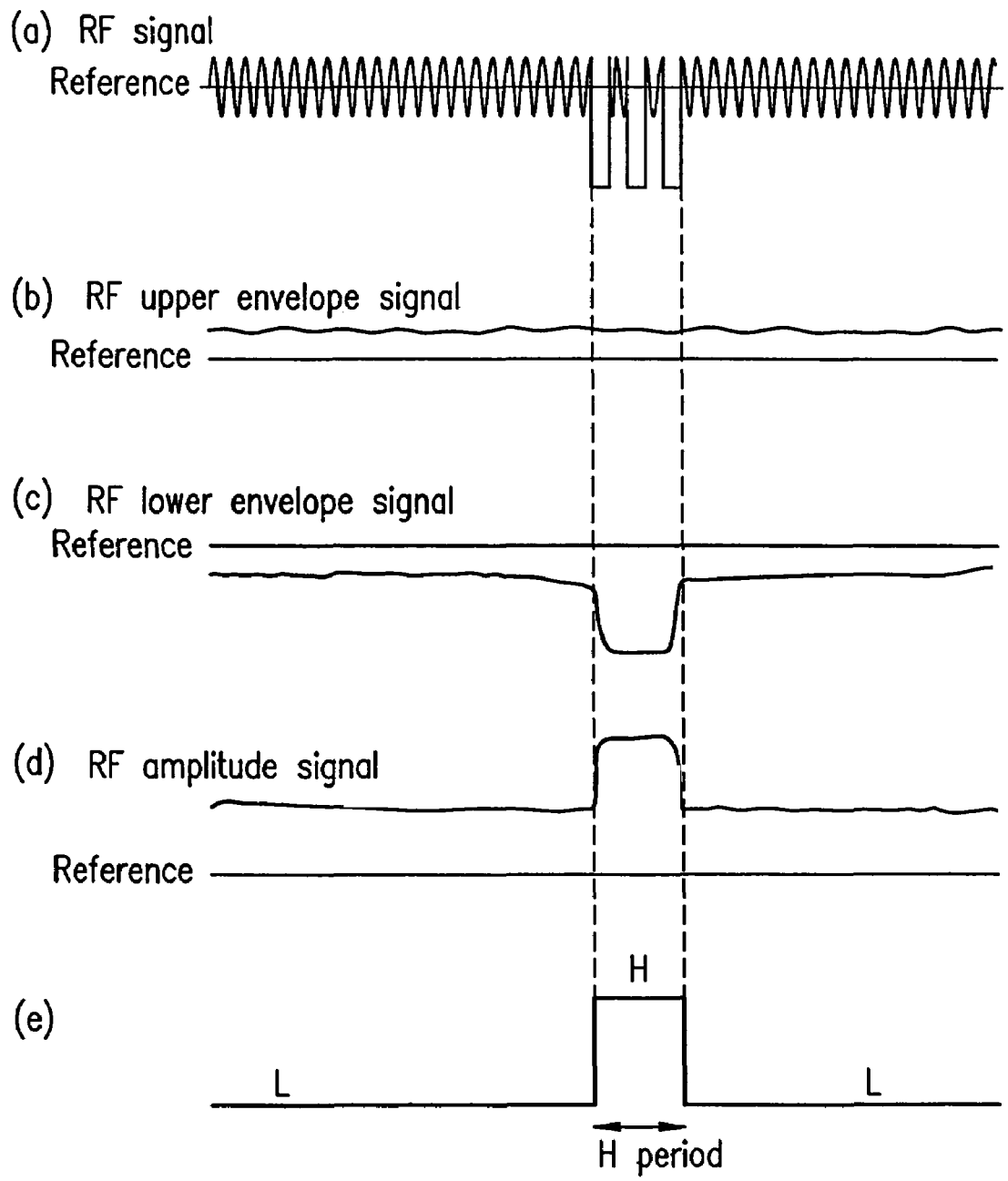
FIG. 13 is a waveform diagram illustrating waveform shaping performed by the bar code area determination section shown in FIG. 12.

FIG. 13 is a waveform diagram illustrating signal changes in the bar code area determination section 357F.

The upper envelope detection section 1220 and the lower envelope detection section 1230 receive an RF signal as shown in part (a) of FIG. 13. The upper envelope detection section 1220 generates an RF upper envelope signal, as shown in part (b) of FIG. 13, representing an upper limit of the RF signal after being processed by the AGC 352. The lower envelope detection section 1230 generates an RF lower envelope signal, as shown in part (c) of FIG. 13, representing a lower limit of the RF signal after being processed by the AGC 352. The RF amplitude detection section 1240 generates an amplitude signal as shown in part (d) of FIG. 13 from the difference between the upper envelope signal and the lower envelope signal.

The level slicing circuit 1020 level-slices the amplitude signal at a prescribed level into an H level and an L level as shown in part (e) of FIG. 13. The comparison section 1030 measures the time period in which the level-sliced amplitude signal is at the H level. When the resultant period is longer than a prescribed time period, the comparison section 1030 determines that the RF signal which is input to the bar code area determination section 357F is read from the bar code area 110.

In general, only an amplitude signal obtained from an RF signal read from the bar code area 110 changes by at least a prescribed level. A amplitude signal obtained from an RF signal read from the control data area 120 does not change. Accordingly, in this example, the bar code area determination section 375F can determine whether or not the RF signal is read from the bar code area 110 based on the time period in which the amplitude signal changes by at least the prescribed level.

In the fifth example, it is not necessary to detect a read clock cycle by a PLL. Therefore, even when the PLL is unstable and the read clock cycle T cannot be stably detected by the PLL, it can be accurately determined whether or not a signal output by the optical head 315 is read from the bar code area 110.

EXAMPLE 6

Figure 14:
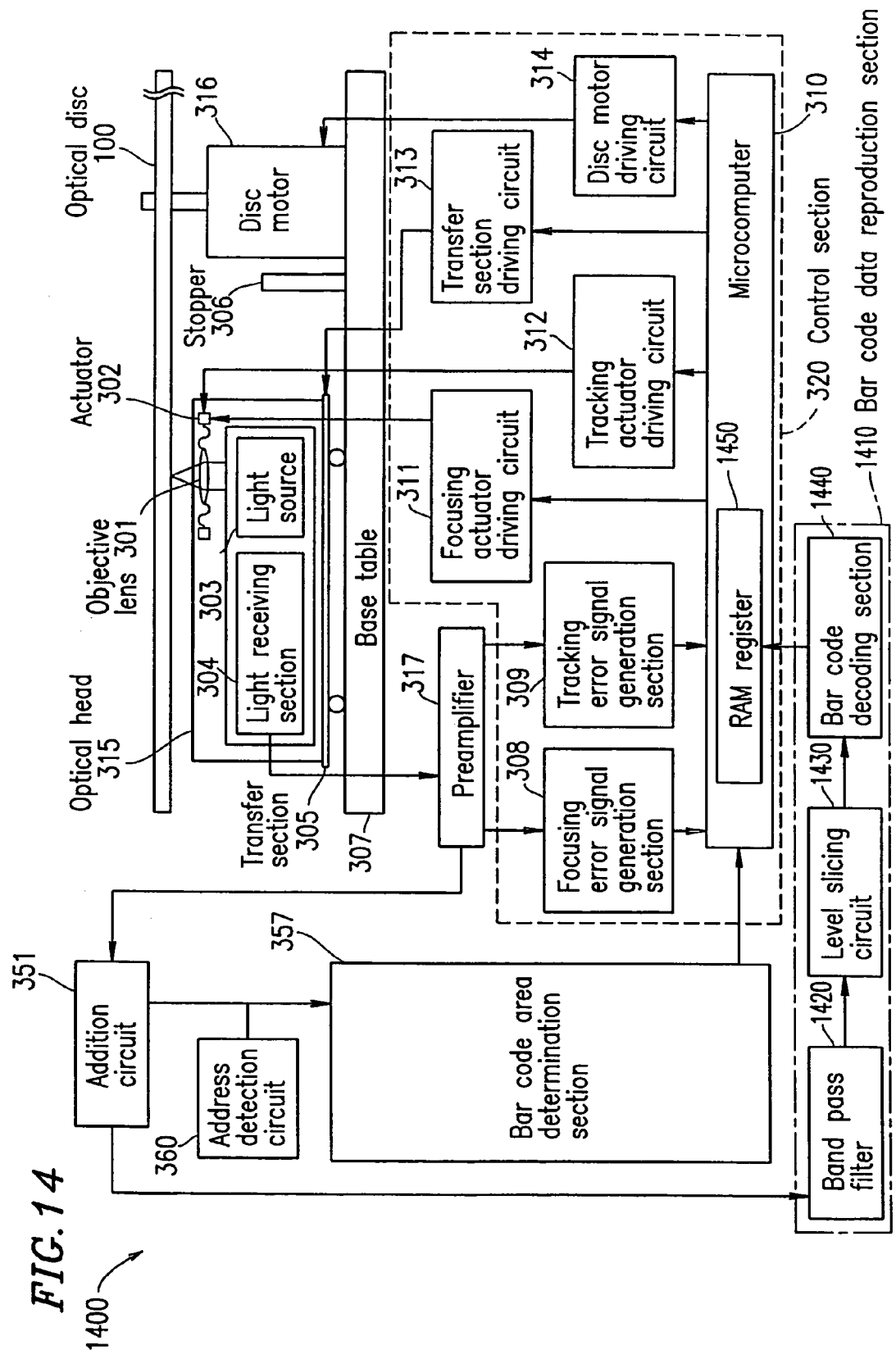
FIG. 14 is a block diagram illustrating a structure of an optical disc apparatus according to a sixth example of the present invention.

FIG. 14 shows an optical disc apparatus 1400 according to a sixth example of the present invention. The optical disc apparatus 1400 has substantially the same structure as that of the optical disc apparatus 300 shown in FIG. 3 except that the optical disc apparatus 1400 includes a bar code data reproduction section 1410 and a RAM register 1450 provided in the microcomputer 310. Identical elements to those of the optical disc apparatus 300 will not be described for the sake of simplicity.

The bar code data reproduction section 1410 includes a band pass filter 1420, a level-sliced circuit 1430 and a bar code decoding section 1440. The RAM register 1450 acts as a bar code data storage section.

In this example, when the bar code area determination section 357 determines that the signal from the optical head 315 is read from the bar code area 110, the bar code data is reproduced by the bar code data reproduction section 1410 and stored in the RAM register 1450.

In the optical disc apparatus 1400, the addition circuit 351 generates an RF signal from a signal recorded on the information track 210 (FIG. 2) of the bar-coded RAM disc 100 by adding signals from the preamplifier 317.

The RF signal which is output from the addition circuit 351 is input to the bar code area determination section 357. Based on the RF signal, the bar code area determination section 357 determines whether or not the optical spot is positioned on the bar code area 110.

Figure 15:
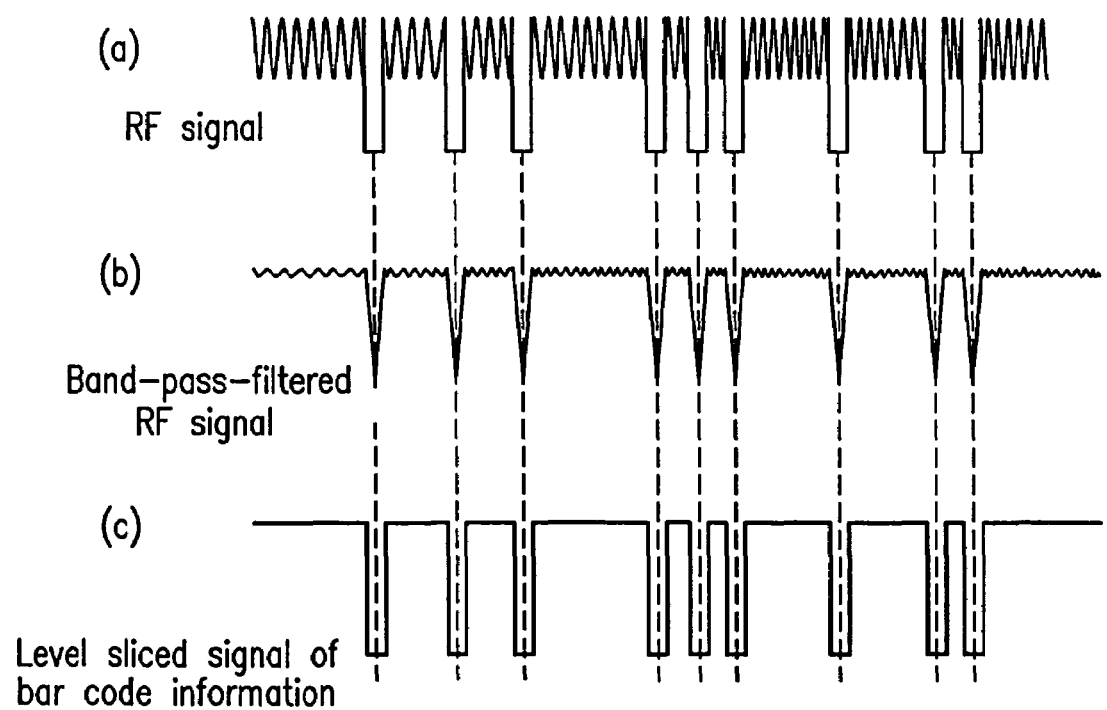
FIG. 15 is a waveform diagram illustrating waveform shaping performed by the optical disc apparatus shown in FIG. 14.

FIG. 15 is a waveform diagram of signals which are output when the optical spot is positioned in the bar code area 110. FIG. 15 is provided to describe waveform shaping performed by the bar code data reproduction section 1410.

The bar code data reproduction section 1410 receives an RF signal from the addition circuit 351. When the optical spot is positioned on the bar code area 110, the RF signal shown in part (a) of FIG. 15 is processed by the band pass filter 1420, i.e., a frequency component in a frequency range outside the frequency range of the signal from the bar code data is removed. As a result, as shown in part (b) of FIG. 15, the signal by the bar code 150 is made clearer.

The level slicing circuit 1430 level-slices the filtered bar code data, which is an analog signal, at a prescribed level, and outputs the signal shown in part (c) of FIG. 15 to the bar code decoding section 1440. The bar code data decoded by the bar code decoding section 1440 is input to the microcomputer 310 and stored in the RAM register 1450.

The optical disc apparatus 1400 moves the optical spot to the control data area 120 in substantially the same manner as described above regarding the optical disc apparatus 300.

In this example, when the optical spot moves to the bar code area 110, the bar code data is reproduced and is stored. As described above, an address representing a position of the optical spot on the bar code area 110 of the bar-coded RAM disc 100 is not reliable. Therefore, the microcomputer 310 instructs the transfer section driving circuit 313 to move the optical spot toward the control data area 120 by a fine distance, instead of reading the address. After the optical spot is moved outward, the bar code area determination section 357 again determines whether the optical spot is on the control data area 120.

The above-described operation is repeated. When the maximum cycle of the RF signal is close to the set cycle, for example, when the bar-coded RAM disc 100 is an 8/16 modulated DVD and the maximum cycle is changed from 20T to close to 18T (the set cycle), the bar code area determination section 357 determines that the optical spot is moved form the bar code area 110 to the control data area 120. Then, the address detection circuit 360 detects an address of the optical spot on the control data area 120, and specifies the leading address of the control data area 120 based on the detected address. Then, the optical spot is moved by repeating one-track jumping toward the leading address. Thus, required control data is read. When the optical spot is moved back to the bar code area 110 by an external impact or the like while the control data is being read from the control data area 120, the bar code area determination section 357 determines that the optical spot is on the bar code area 110. Therefore, as described above, the optical spot is moved to the control data area 120 again.

In the sixth example, when the optical spot is located on the bar code area 110 while accessing the control data area 120, the bar code data is reproduced and stored in preparation of a later time at which the bar code may be required. Accordingly, when the bar code is required later, it is not necessary to search for the bar code, which can save time for reading the bar code.

EXAMPLE 7

Figure 16:
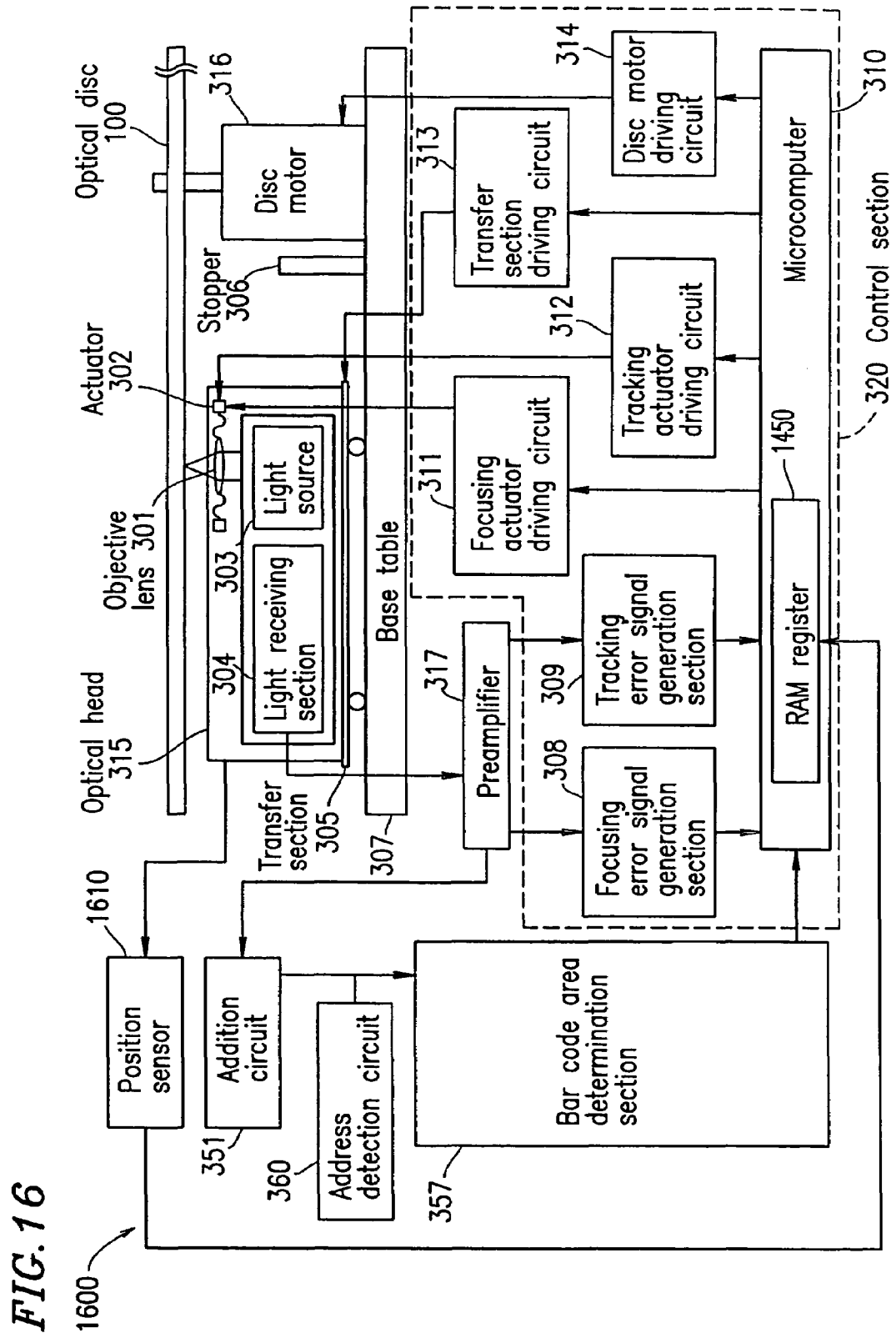
FIG. 16 is a block diagram illustrating a structure of an optical disc apparatus according to a seventh example of the present invention.

FIG. 16 shows an optical disc apparatus 1600 according to a seventh example of the present invention. The optical disc apparatus 1600 has substantially the same structure as that of the optical disc apparatus 300 shown in FIG. 3 except that the optical disc apparatus 1600 includes a position sensor 1610 and a RAM register 1450 provided in the microcomputer 310. Identical elements to those of the optical disc apparatus 300 will not be described for the sake of simplicity.

In the optical disc apparatus 1600, the addition circuit 351 generates an RF signal from a signal recorded on the information track 210 (FIG. 2) of the bar-coded RAM disc 100 by adding signals from the preamplifier 317, like in the optical disc apparatus 300.

The RF signal which is output from the addition circuit 351 is input to the bar code area determination section 357. Based on the RF signal, the bar code area determination section 357 determines whether or not the optical spot is positioned on the bar code area 110. The optical spot is moved toward the control data area 120 as described above.

When the optical spot moves to the bar code area 110, an address representing a position of the optical spot is not reliable. Therefore, the microcomputer 310 instructs the transfer section driving circuit 313 to move the optical spot toward the control data area 120 by a fine distance, instead of reading the address. After the optical spot is moved outward, the bar code area determination section 357 again determines whether the optical spot is on the control data area 120.

The above-described operation is repeated. When the maximum cycle of the RF signal is close to the set cycle, for example, when the bar-coded RAM disc 100 is an 8/16 modulated DVD and the maximum cycle is changed from 20T to close to 18T (the set cycle), the bar code area determination section 357 determines that the optical spot is completely moved to the control data area 120 from the bar code area 110. During this operation, no address is read.

By this processing, when the optical spot is completely moved from the bar code area 110 to the control data area 120, the RAM register 1450 stores the position of the border between the bar code area 110 and the control data area 120. When the optical spot passes the border, the bar code area determination section 357 determines that the optical spot is completely moved to the control area 120 from the bar code area 110. The position of the border is detected by the position sensor 1610 provided at a prescribed position of the optical head 315. The position sensor 1610 detects an address of an information track 210 of the bar-coded RAM disc 100, the number of pulses fed from the stopper 306 (when the feeding motor for moving the transfer section 305 is a stepping motor), or the position of the optical head 315. Position information or the like provided by the position sensor 1610 is used to detect the border. The position of the border is detected as a value which is recognizable by the microcomputer 310.

The obtained position information is input to the microcomputer 310 through an A/D conversion section (not shown) or the like and stored on the RAM register 1450 built in the microcomputer 310. In this example, the RAM register 1450 acts as a position storage section.

In the case where, for example, the feeding motor for moving the transfer section 305 is a stepping motor, the operation is performed as follows based on the flowchart 500 shown in FIG. 5.

After step 501, the value of the position sensor 1610 is cleared. The operation of steps 502 through 507 is performed. The value of the position sensor 1610 when step 507 is finished is stored. When, for example, the optical spot is completely moved to the control data area 120 in the state where the number of pulses fed outward by the stopper 306 is 10, the value of 10 is stored in the RAM register 1450.

In the seventh example, in the case where the bar code data recorded in the bar code area 110 needs to be read at a later time, the optical spot can be moved to the bar code area 110 at a high speed by referring to the position information on the border between the bar code area 110 and the control data area 120 which is stored in the RAM register 1450.

Even when the optical spot is moved to the user data area 130 while moving from the user data area 130 to the control data area 120, it is guaranteed that the optical spot is eventually moved to the control data area 120 with an improved level of reliability, by referring to the position information on the border between the bar code area 110 and the control data area 120 which is stored in the RAM register 1450.

In the first through seventh examples, the bar-coded RAM disc 100 is used as a bar-coded optical disc. The present invention is applicable to any types of bar-coded optical disc including a bar-coded ROM disc. When the present invention is applied to a bar-coded ROM disc, the optical spot can access the control data area from the bar code area. It is not necessary to once move the optical spot to the user data area through the control data area and then back to the control data area.

As described above, the present invention provides a highly reliable optical disc apparatus for stably accessing a control data area of a bar-coded optical disc, regardless of whether the bar-coded optical disc is a ROM disc or a RAM disc, and a method for accessing the control data area, which is suitable to a bar-coded RAM.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc apparatus usable for an optical disc including a bar code area and including a control data area beside the bar code area, the optical disc apparatus comprising:

an optical head for emitting an optical beam toward the optical disc so as to form an optical spot on the optical disc and output a signal obtained by the optical beam reflected by the optical disc;

a bar code reading section for reading data when the optical spot is positioned on the bar code area of the optical disc; and a tracking control system for controlling the optical head positioning so that the optical spot accesses a track in the control data area, when the optical spot steps into the bar code area.

2. An optical disc apparatus according to claim 1, wherein the optical disc further includes a recording and reproduction area accessed by the optical head.

3. An optical disc apparatus according to claim 1, further comprising:

a control data area reading section for reading information from the track in the control data area of the optical disc, and an address detection section for detecting an address of the track on which the optical spot is accessing.

4. An optical disc apparatus according to claim 1, wherein the tracking control system re-tries track access until the optical spot is on the track in the control data area.

5. An optical disc apparatus according to claim 1, wherein the bar code reading section detects the existence of the bar code at rotation of at least $11/12$ of typical rotation of the optical disc which is determined by standardized data clock rate.

\* \* \* \* \*

UNITED STATES PATENT AND TRADEMARK OFFICE
CERTIFICATE OF CORRECTION

PATENT NO.        : 7,480,232 B2
APPLICATION NO.   : 11/159801
DATED             : January 20, 2009
INVENTOR(S)       : Yuichi Kuze et al.

It is certified that error appears in the above-identified patent and that said Letters Patent is hereby corrected as shown below:

Front Page, Section (73), should include, -- This patent subject to a terminal disclaimer. --.

Column 22, line 27, "11/12of" should read -- 11/12 of --.

Signed and Sealed this

Sixteenth Day of June, 2009

JOHN DOLL
*Acting Director of the United States Patent and Trademark Office*